United States Patent [19]
Ogawa

[11] Patent Number: 5,008,127
[45] Date of Patent: Apr. 16, 1991

[54] PROCESS FOR THE PRODUCTION OF A HIGHLY-ORIENTATED ULTRALONG CONJUGATED POLYMER

[75] Inventor: Kazufumi Ogawa, Hirakata, Japan

[73] Assignee: Matsushita Electric Industrial Co., Ltd., Osaka, Japan

[21] Appl. No.: 482,965

[22] Filed: Feb. 22, 1990

[30] Foreign Application Priority Data

| Feb. 27, 1989 | [JP] | Japan | 1-045993 |
| Feb. 27, 1989 | [JP] | Japan | 1-45994 |
| Feb. 27, 1989 | [JP] | Japan | 1-45995 |
| Feb. 27, 1989 | [JP] | Japan | 1-45996 |

[51] Int. Cl.$^5$ ............................................. B05D 3/06
[52] U.S. Cl. ................................. 427/36; 427/43.1; 427/44; 427/54.1; 427/299; 427/430.1
[58] Field of Search ............... 427/430.1, 36, 43.1, 427/44, 54.1, 11, 299

Primary Examiner—Bernard Pianalto
Attorney, Agent, or Firm—Stevens, Davis, Miller & Mosher

[57] ABSTRACT

A process for producing a highly-orientated ultralong conjugated polymer while the orientation thereof is maintained, which comprises:

a step of immersing a substrate having a hydrophilic surface in a nonaqueous organic solvent containing a compound having at least an unsaturated group, such as an acetylenic group, etc., and $-SiA_xH_{3-x}$ group in which A denotes chloro or lower alkyl and x is an integer of from 1 to 3, whereby forming a monomolecular film of the above compound on the substrate, a step of orientation the monomolecular film in a specific direction, and a step of polymerizing the monomolecular film by using irradiation or a metal salt catalyst, the irradiation using electron beam, X-ray or gamma ray, the metal salt catalyst being $MoCl_5$, $MCl_6$, $NbCl_5$, $TaCl_5$, or the like as a metal halide catalyst, or $Mo(CO)_5$, $W(CO)_6$, $Nb(CO)_5$, $Ta(CO)_5$, or the like as a metal carbonyl catalyst.

34 Claims, 23 Drawing Sheets

22 MONOMOLECULAR FILM

21 SUBSTRATE

REACTION IN THE PRESENCE OF CATALYST

24 CIS-POLYACETYLENIC BOND

21 SUBSTRATE

MONOMOLECULAR FILM FORMATION →

(IN THIS FIGURE, O STANDS FOR SiCl₃)

20 MONOMOLECULAR FILM

21 SUBSTRATE

POLYMERIZATION IN THE PRESENCE OF CATALYST

23 TRANS-POLYACETYLENIC BOND

21 SUBSTRATE

POLYMERIZATION BY IRRADIATION WITH RADIATION →

25 POLYACENIC BOND

21 SUBSTRATE

FIG. IIA
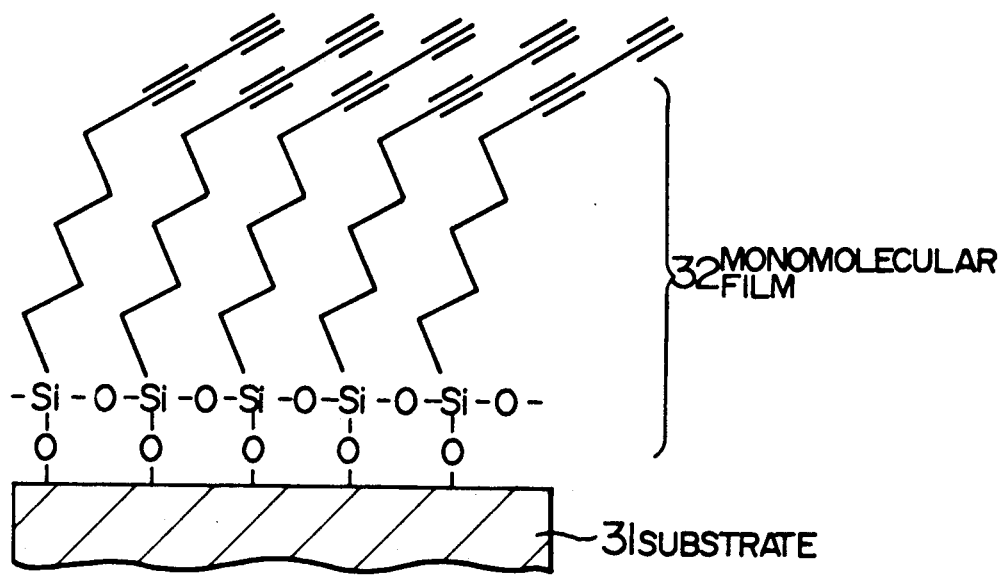
FIG. IIB
POLYMERIZATION BY IRRADIATION WITH RADIATION
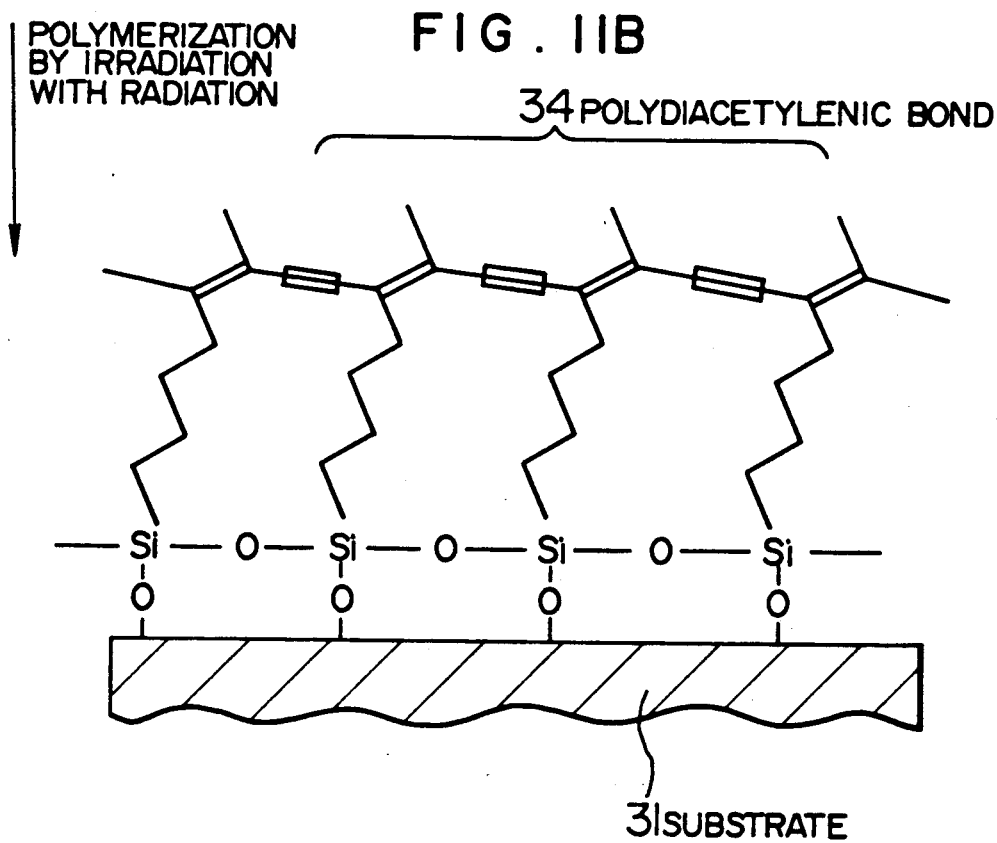

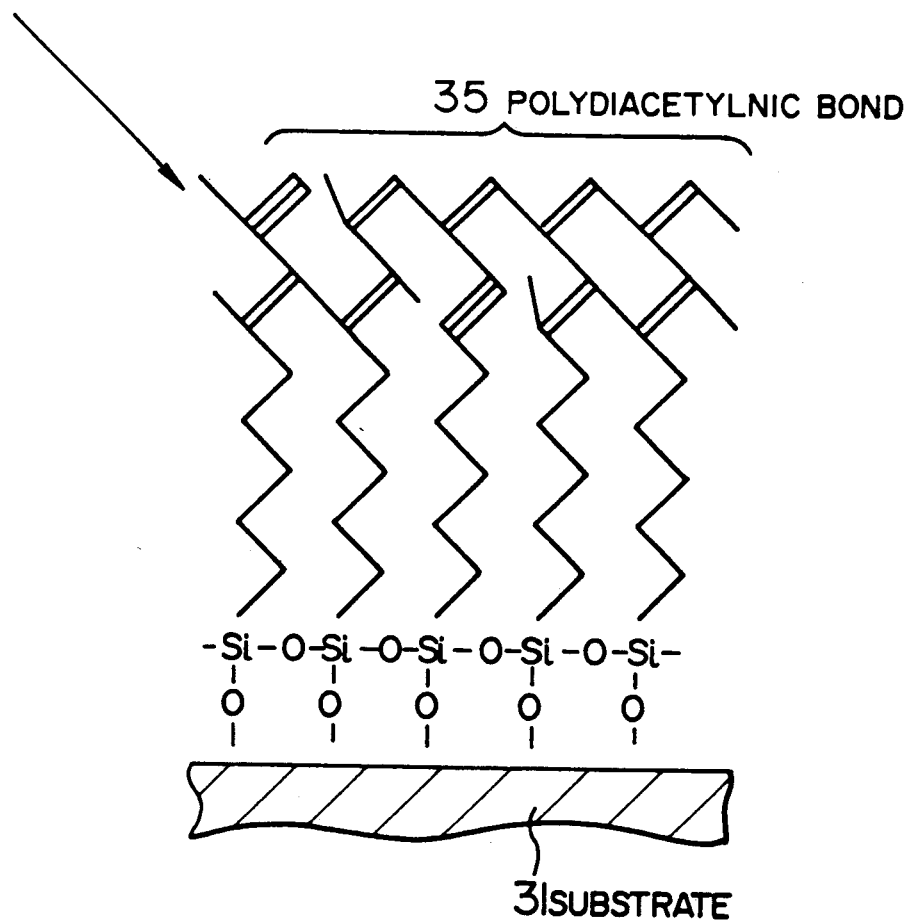

POLYMERIZATION
IN THE PRESENCE
OF CATALYST

POLYMERIZATION IN THE PRESENCE OF CATALYST

42 MONOMOLECULAR FILM

41 SUBSTRATE

↓ POLYMERIZATION IN THE PRESENCE OF CATALYST

44 CIS-POLYACETYLENIC BOND

41 SUBSTRATE

42 MONOMOLECULAR FILM

41 SUBSTRATE

POLYMERIZATION IN THE PRESENCE OF CATALYST

43 TRANS-POLYACETYLENIC BOND

41 SUBSTRATE

PROCESS FOR THE PRODUCTION OF A HIGHLY-ORIENTATED ULTRALONG CONJUGATED POLYMER

BACKGROUND OF THE INVENTION

This invention relates to an electric material and more specifically, it relates to a process for the production of a highly-orientated ultralong conjugated polymer having conjugated bonds, such as polyacetylenic bonds, which exhibits electrical conductivity and nonlinear optical effects.

Polymers of acetylene, a derivative thereof, etc., have, in the molecule, a linear main chain having a $\pi$-electron conjugated bond system and therefore have electrical conductivity and nonlinear optical effects. For this reason, they are widely studied as an optical and electronic function materials.

As a process for producing polymers of acetylene or its derivative, a polymerization process of Shirakawa et al is well known, which uses a Ziegler-Natta catalyst.

Since, however, presently known polymers of acetylene and its derivatives are unstable to heat, pressure, UV ray, etc., in oxygen-containing atmosphere, studies are being made for the stabilization thereof.

However, no method has been found for the stabilization of polymers of acetylene or its derivatives.

Further, no technique has been developed for the control of the orientation of polymers of acetylene and its derivatives.

In view of the above problems, there is provided, according to this invention, a process for the production of a ultralong conjugated polymer having high stability and high orientation.

SUMMARY OF THE INVENTION

The process for the production of a highly-orientated ultralong conjugated polymer according to this invention comprises a step of forming a monomolecular film of a compound having, in the molecule, at least an unsaturated group, such as an acetylenic group, and a chloro- or alkylsilyl group on a hydrophilic substrate and linearly inactivating the monomolecular film in a specific direction or orientating by rubbing it in a specific direction, and a step of polymerizing the monomolecular film.

BRIEF DESCRIPTION OF THE DRAWINGS

FIGS. 11A, 11B, and 11C are process illustrations showing a process for the production of a highly-orientated ultralong conjugated polymer having a polydiacetylenic bond.

DETAILED DESCRIPTION OF THE PREFERRED EMBODIMENTS

Figure 1A:
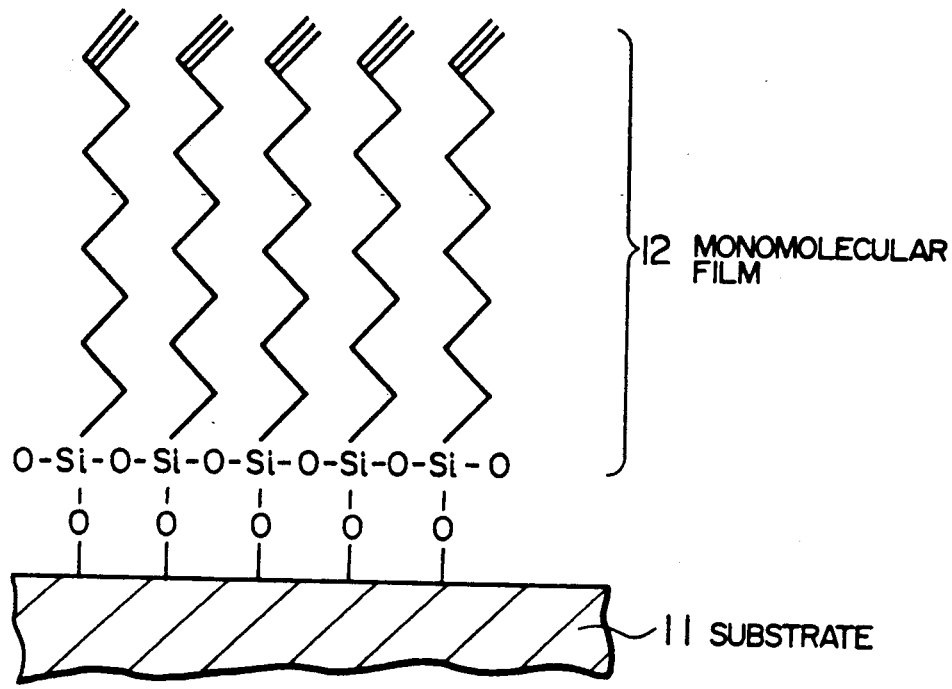
FIGS. 1A and C are process illustrations showing a process for the production of a highly-orientated ultralong conjugated polymer comprised of an NCS monomolecular film and having a trans-polyacetylenic bond.

The first aspect of this invention is directed to a process for the production of a highly-orientated ultralong conjugated polymer, which comprises:

a step of immersing a substrate having a hydrophilic surface in a nonaqueous organic solvent having, dissolved, a compound containing, in the molecule, at least an unsaturated group such as an acetylenic group, etc., and a (mono, di or tri) chloro- or alkylsilyl group ($-SiA_xH_{3-x}$ in which A denotes a chloro or lower alkyl group and x denotes an integer of from 1 to 3), whereby forming a monomolecular film of the above compound on the substrate by chemisorption, a step of selectively and linearly inactivating unsaturated groups of the monomolecular film by means of writing with STM (scanning tunneling microscope), exposure to an electron ray, or exposure to X-ray, and a step of irradiating the entire surface of the substrate with radiation in an inert gas atmosphere to polymerize that remaining unsaturated group portion of the monomolecular film which has not been inactivated.

The second aspect of this invention is directed to a process for the production of a highly-orientated ultralong conjugated polymer, which comprises:

a step of immersing a substrate having a hydrophilic surface in a first nonaqueous organic solvent having, dissolved, a compound containing at least an unsaturated group such as acetylenic group ($-C\equiv C-$), etc., and a (mono, di or tri) chloro- or alkylsilyl group ($-SiA_xH_{3-x}$ in which A denotes a chloro or lower alkyl group and x denotes an integer of from 1 to 3) whereby forming a monomolecular film of the above compound on the substrate by chemisorption, a step of selectively and linearly inactivating unsaturated groups of the monomolecular film by means of writing with STM (scanning tunneling microscope), exposure to an electron beam or exposure to X-ray, and a step of immersing the substrate on which the monomolecular film is formed in a second organic solvent containing a metal halide catalyst or a metal carbonyl catalyst to polymerize that remaining unsaturated group portion of the monomolecular film which has not been inactivated.

When there is used a compound containing a diacetylenic group ($-C\equiv C-C\equiv C-$), one of the two acetylenic groups in the diacetylenic group may be first polymerized in the second organic solvent, and then high-energy radiation may be used to form a polyacenic bond.

The third aspect of this invention is directed to a process for the production of a highly-orientated ultralong conjugated polymer, which comprises:

a step of immersing a substrate having a hydrophilic surface in a nonaqueous organic solvent having, dissolved, a compound containing, in the molecule, at least an unsaturated group such as an acetylenic group ($-C\equiv C-$), etc., and a (mono, di or tri) chloro- or alkylsilyl group, whereby forming a monomolecular film of the above compound on the substrate by chemisorption, a step of orientating the monomolecular film by rubbing, and a step of irradiating the substrate with radiation in an inert gas atmosphere to polymerize the unsaturated group portion of the monomolecular film.

The fourth aspect of this invention is directed to a process for the production of a highly-orientated ultralong conjugated polymer retaining orientation, which comprises:

a step of immersing a substrate having a hydrophilic surface in a nonaqueous organic solvent having, dissolved, a compound containing, in the molecule, at least an unsaturated group such as an acetylenic group ($-C\equiv C-$) and a chloro- or alkylsilyl group ($-SiA_xH_{3-x}$ in which A and x are as defined above), whereby forming a monomolecular film of the above compound on the substrate by chemisorption, a step of orientating the monomolecular film by rubbing, whereby forming the monomolecular film of the above compound on the substrate in such a state that the molecules of the above compound are orderly orientated, and a step of polymerizing the monomolecular film formed on the substrate by using a catalyst as specified in the first aspect.

In general, it is known that when there is used a linear hydrocarbon derivative having a chlorosilyl ($-SiCl_xH_{3-x}$) or an alkylsilyl group (to be typified by chlorosilyl groups hereinafter), a monomolecular film of the derivative can be formed on a hydrophilic surface of a substrate in an organic solvent by chemisorption, and further that a built-up film of the above monomolecular film can be formed by irradiating the above monomolecular film with high-energy radiation in an oxygen-containing atmosphere to turn the surface thereof to hydrophilic property.

Therefore, if a compound such as a linear hydrocarbon derivative having a chlorosilyl group on one end thereof and containing an acetylenic group or diacetylenic group in part thereof is used to carry out chemisorption, it is possible to form a monomolecular film of an acetylene derivative or diacetylene derivative in an order of dozens of angstroms, and further, a multi-layer film can be also obtained. And, after the above monomolecular film is formed, unsaturated groups of the monomolecular film are selectively and linearly inactivated in a specific direction, and then the remaining acetylenic group or diacetylenic group portion of the monomolecular film is polymerized by irradiating the entirety of the monomolecular film with energy rays such as high-energy radiation or UV ray in an inert gas atmosphere, whereby there is obtained a polyacetylene-type or polydiacetylene-type polymer which has high orientation, a high molecular weight and a very long conjugated bond system, and which is also stable even in an oxygen-containing atmosphere. Namely, a ultrahigh-molecular-weight polymer having a continuous conjugated bond system (ultralong conjugated polymer, the polymerization degree being more several hundreds) can be obtained by polymerizing molecules of an acetylene derivative or diacetylene derivative by means of irradiation with energy ray while the monomolecular film retains a constant directional property.

That is, a substrate having a hydrophilic surface is immersed in a nonaqueous organic solvent having, dissolved, a compound containing, in the molecule, at least an unsaturated group such as an acetylenic group ($-C\equiv C-$), a diacetylenic group ($-C\equiv C-C\equiv C-$) or the like and a chlorosilyl group ($-SiCl_xH_{3-x}$) to form a monomolecular film of the above compound on the substrate, and then, unsaturated groups of the monomolecular film are selectively and linearly inactivated and then polymerized, whereby the monomolecular film of the above compound can be linearly held on the substrate in such a state that the polymerization direction of molecules of the monomolecular film is orderly orientated. Further, that portion of the monomolecular film which has not been inactivated is polymerized in the linear direction by means of radiation or UV ray, whereby a highly-orientated ultralong conjugated polymer can be produced which is in a state that its polymerization direction is controlled. The monomolecular film may naturally be rubbed instead of being inactivated for the orientation. In this case, the entirety of the monomolecular film is polymerized after the orientation.

In addition, the polymerization reaction of unsaturated groups such as acetylenic groups, etc., in the first and third aspects may use radiation such as X-ray, electron ray or gramma ray, and when the monomolecular film contains a diacetylenic group, the polymerization may use UV ray other than X-ray, electron ray and gamma ray.

Examples of the metal catalyst preferably usable in the second and fourth aspects include $MoCl_5$, $WCL_6$, $NbCl_5$ and $TaCl_5$ as a metal halide catalyst and $Mo(CO)_5$, $W(CO)_6$, $Nb(CO)_5$ and $Ta(CO)_5$ as a metal carbonyl catalyst.

Example of the second solvent dissolving these include toluene, dioxane, anisole, etc.

The substrate having a hydrophilic surface is not critical, and any substrate is usable which can form an —Si—O— bond by reacting with a chloro- or alkylsilyl group.

As a compound having, in the molecule, at least an acetylenic group (—C≡C—) and a silyl group (—$SiA_xH_{3-x}$ in which A denotes a chloro or lower alkyl group and x is an integer of from 1 to 3), used to form the monomolecular film, it is possible to cite acetylene derivative having one terminal acetylenic group, represented by the following formula

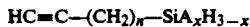

wherein n is an integer of from 14 to 24, x is an integer of from 1 to 3 and A is an defined above.

In particular, acetylene derivatives of the above formula wherein n is 17 are suitably usable. In addition, the present specification sometimes refers thereto simply as NCS.

Further, as a compound having a diacetylenic group, it is possible to cite diacetylene derivatives having one terminal diacetylenic group, represented by the following formula

wherein n is an integer of from 14 to 24, x is an integer of from 1 to 3, and A denotes a chloro or lower alkyl group.

In particular, tricosadiynoic chlorosilane is suitably usable which is represented by the above formula in which n is 19 and A is chloro.

Examples of the nonaqueous organic solvent to dissolve the above compounds include a mixture of chloroform, carbon tetrachloride and n-hexadecane. However, any nonaqueous solvents are usable if they can dissolve the above compounds and do not prevent the formation of the monomolecular film of this invention.

This invention will be explained in detail hereinbelow by reference to Examples.

EXAMPLE 1

A variety of compounds were used to form monomolecular films in Examples. The explanation in this Example focuses on the case of using ω-nonadecynyltrichlorosilane which is one of acetylene derivatives and has one terminal acetylenic group, represented by the following formula,

A silane-based surfactant, NCS,

is chemisorbed on an Si substrate 11 having a diameter of 3 inches and having an $SiO_2$ film formed on the surface, whereby a monomolecular film is formed on the surface of the substrate 11. In this case, a chlorosilyl group (—$SiCl_3$) of the silane-based surfactant, NCS, and an —OH group present on the $SiO_2$ film surface of the substrate 11 react with each other to form, on the surface of the substrate 11, a monomolecular film 12 having the following structure:

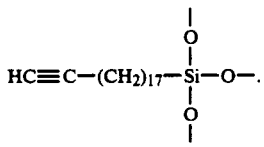

For example, an Si substrate having an $SiO_2$ film formed on the surface was immersed in a solution of $1.0 \times 10^{-3}$ to $4.0 \times 10^{-3}$ mol/l of the above silane-based surfactant, NCS, in 85% n-hexadecane, 8% carbon tetrachloride and 7% chloroform at room temperature for 8 minutes, whereby an —Si—O— bond was formed on the $SiO_2$ film surface (FIG. 1A).

The formation of the monomolecular film 12 having a structure of

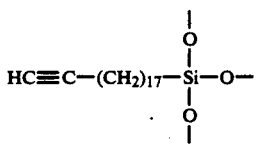

on the substrate 11 was found by FT-IR.

In addition, the above formation of the monomolecular film 12 was carried out in a nitrogen atmosphere containing no moisture.

Figure 1B:
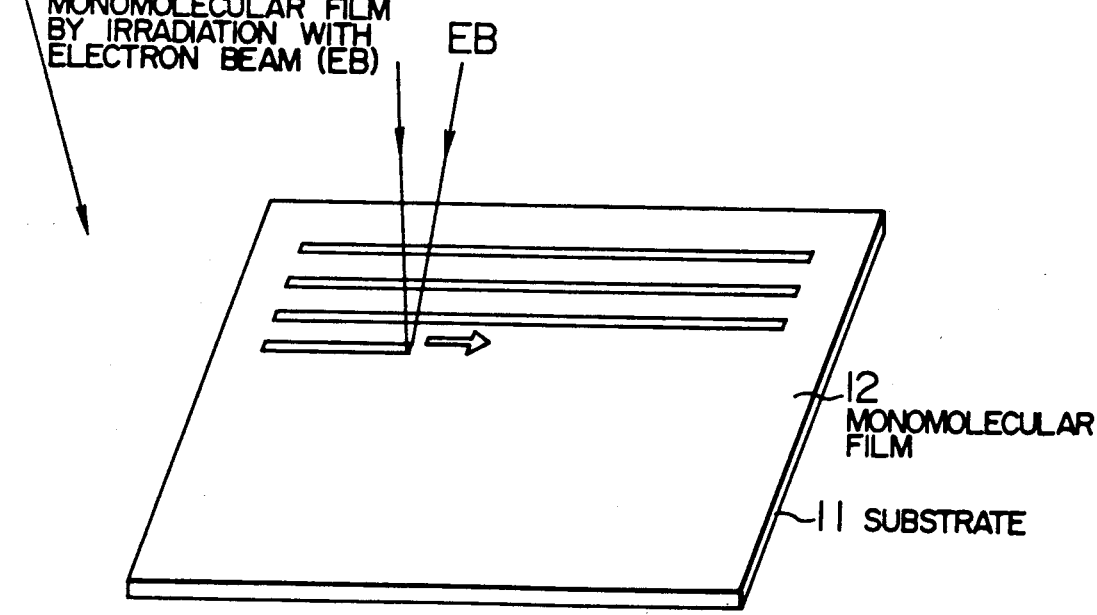
FIG. 1B is a schematic view showing a step of selectively and linearly inactivating unsaturated groups of the monomolecular film by means of electron beam exposure (EB irradiation).
Figure 1C:
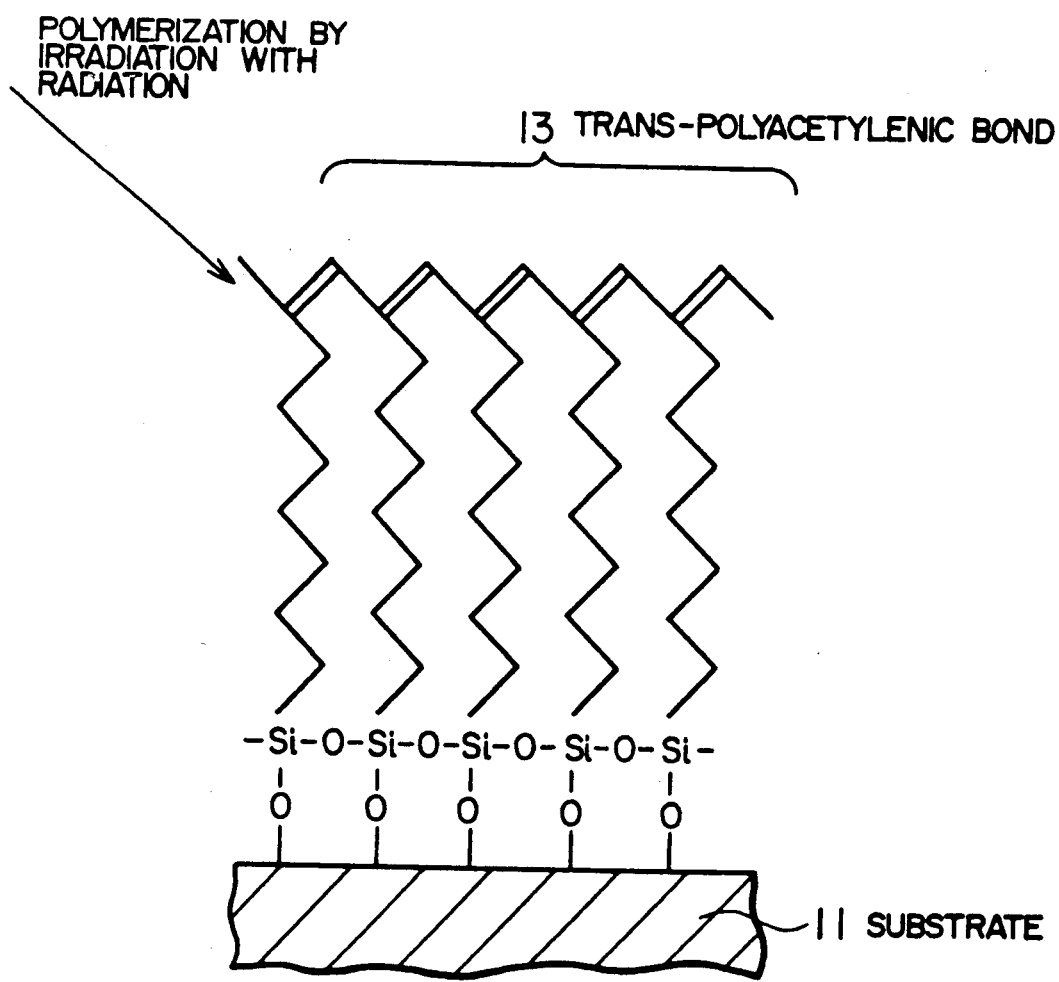

Then, as shown in FIG. 1B, unsaturated groups of the above monomolecular film were linearly inactivated by writing with STM (scanning tunneling microscope), exposure to an electron ray or exposure to X-ray (the exposure amount may be about 5 mJ/cm² in each case) to allow the unsaturated groups to remain linearly in a certain direction, and thereafter, the entire surface of the monomolecular film was irradiated with radiation (e.g. x-ray, electron ray or gamma ray) at 5 to 10 mJ/cm² in an atmosphere of an inert gas such as helium to cause a reaction as shown in FIG. 1C, whereby remaining acetylenic groups which were not inactivated were linearly polymerized to form a trans-polyacetylenic bond 13, which formation was found by FT-IR. In addition, although the X-ray, electron beam and gamma ray had a different energy level, similarly polymerized monomolecular films were obtained.

Figure 2A:
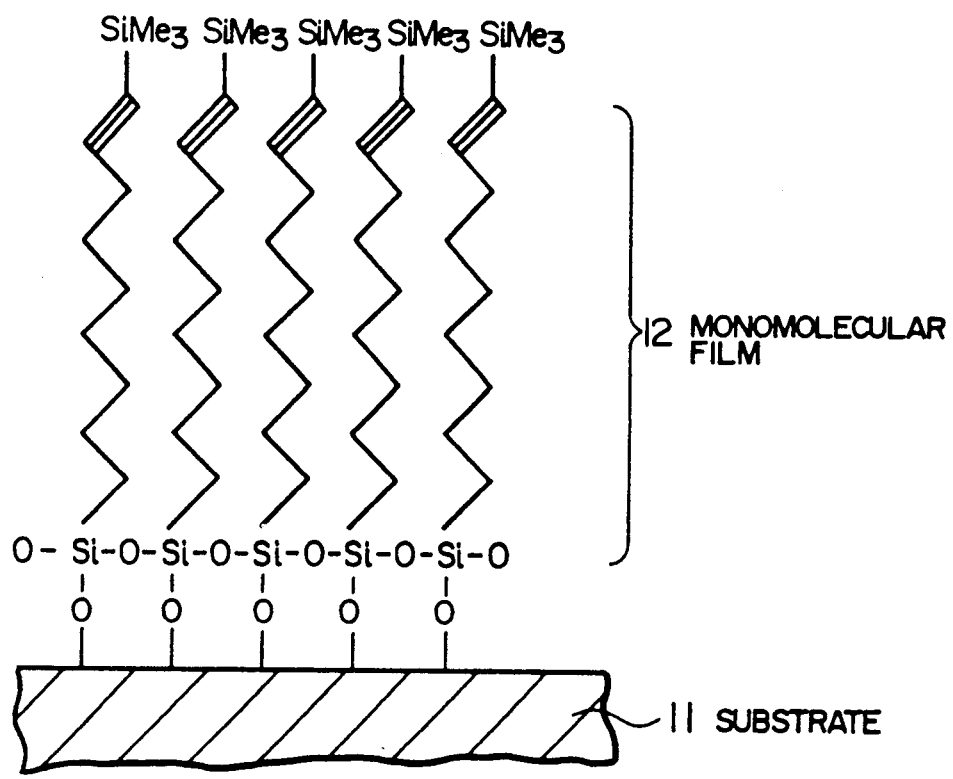
FIGS. 2A and B are process illustrations showing a process for the production of a highly-orientated ultralong conjugated polymer comprised of a TMS-NCS monomolecular film and having a trans-polyacetylenic bond.
Figure 2B:
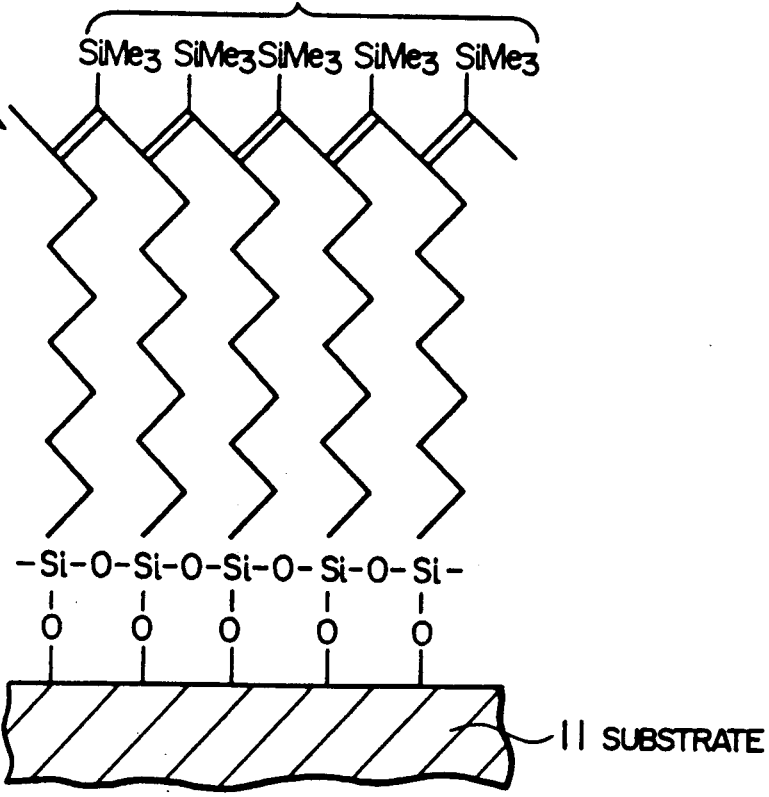

One layer of a monomolecular film 12 of 1-(trimethylsilyl)-ω-nonadecynyltrichlorosilane, in which A of the foregoing formula is a methyl group or one member of the lower alkyl groups,

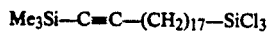

was formed on the above Si substrate 11 (FIG. 2A), the substrate 11 was selectively inactivated, and then the entire surface of the substrate was irradiated with radiation to cause a reaction as shown in FIG. 2B, whereby a linear and high-orientation trans-polyacetylenic bond 13 having trimethylsilyl groups (—SiMe₃) was formed.

In addition, it was found that monomolecular films built up according to the above process were insoluble in alcohol.

The above results have shown that the polymerization method of this invention makes it possible to easily produce trans-form highly-orientated ultralong conjugated polymers.

Further, highly-orientated ultralong conjugated polymers produced as above were remarkably stable to heat and pressure or UV ray even in an oxygen-containing atmosphere as compared with conventional polymers produced by using a Ziegler-Natta catalyst.

The above embodiments have been explained by using only NCS and TMS-NCS as a compound to form monomolecular films. However, it is clear that compounds having, in the molecule, an unsaturated group such as an acetylenic group, etc., and capable of forming a monomolecular film by an LB method, etc., can be similarly used for the above method even if the depositing conditions differ.

Figure 3A:
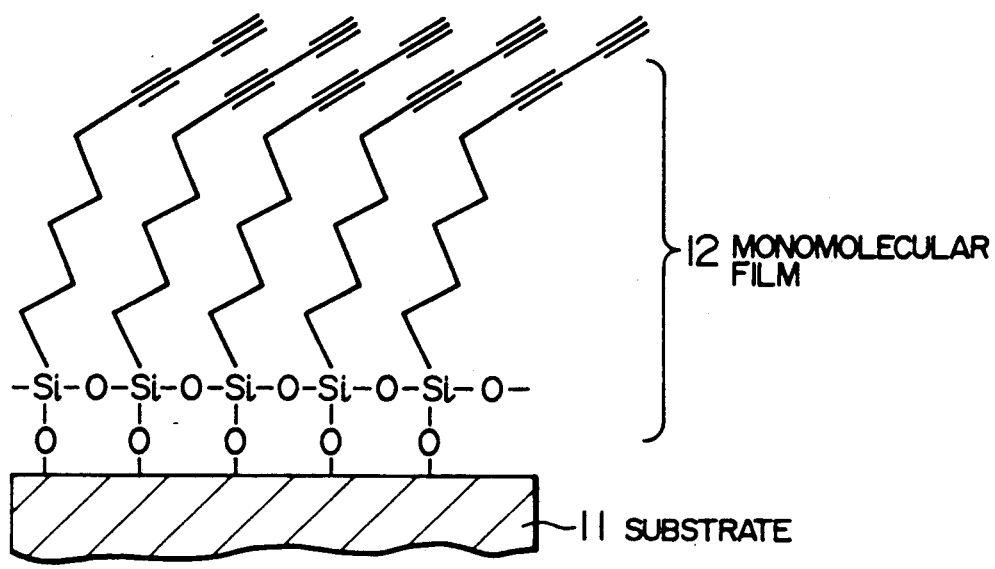
FIGS. 3A and B are process illustrations showing a process for the production of a highly-orientated ultralong conjugated polymer having a polydiacetylenic bond.
Figure 3B:
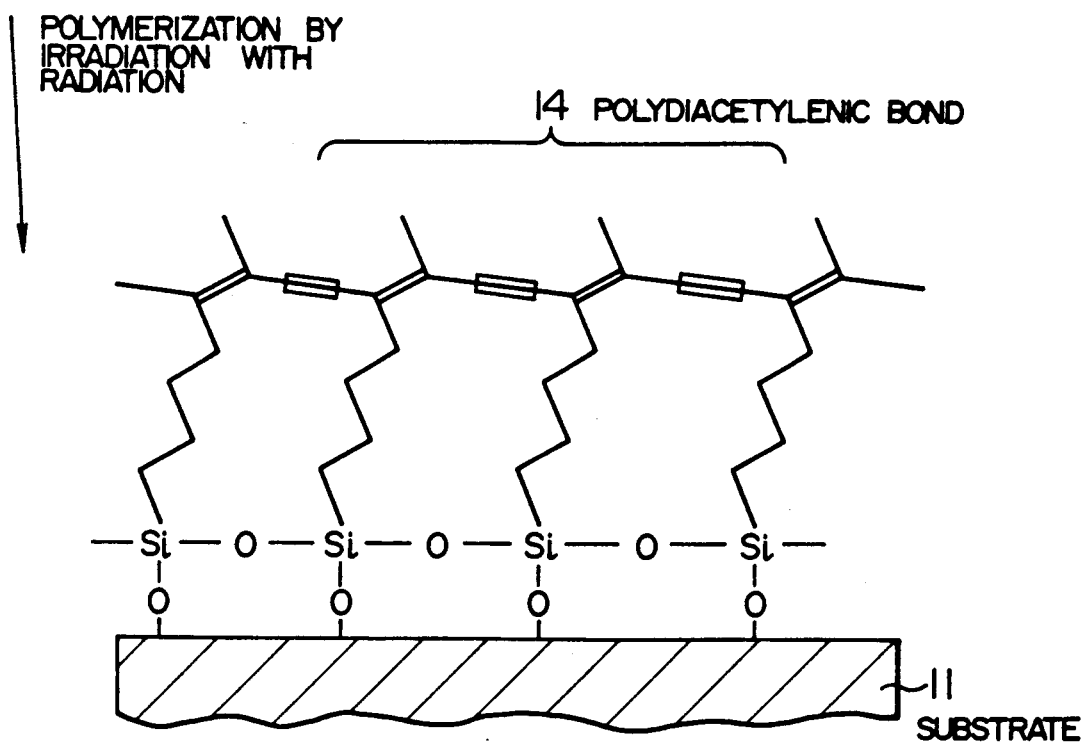
FIG. 3C is a process illustration showing a process for the production of a highly-orientated ultralong conjugated polymer having a polyacetylenic bond.
Figure 3C:
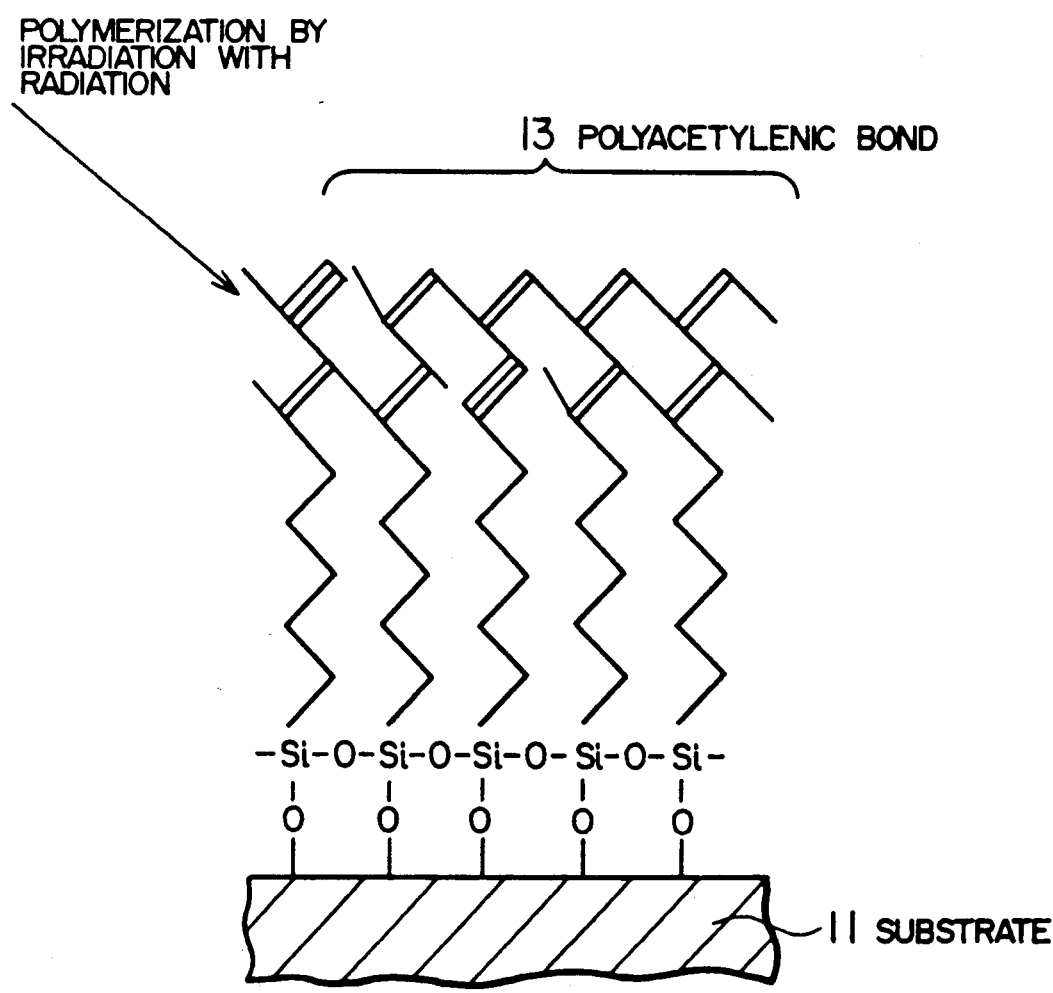
Figure 5A:
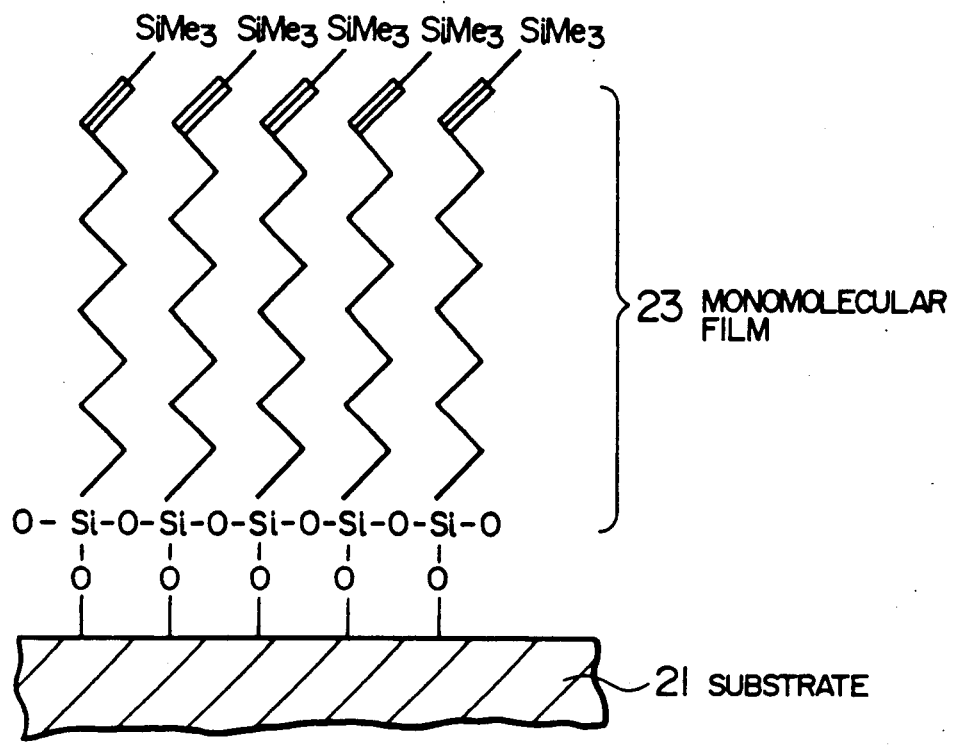
FIGS. 5A and B are process illustrations showing a process for the production of a highly-orientated ultralong conjugated polymer comprised of a TMS-NCS monomolecular film and having a trans-polyacetylenic bond.
Figure 5B:
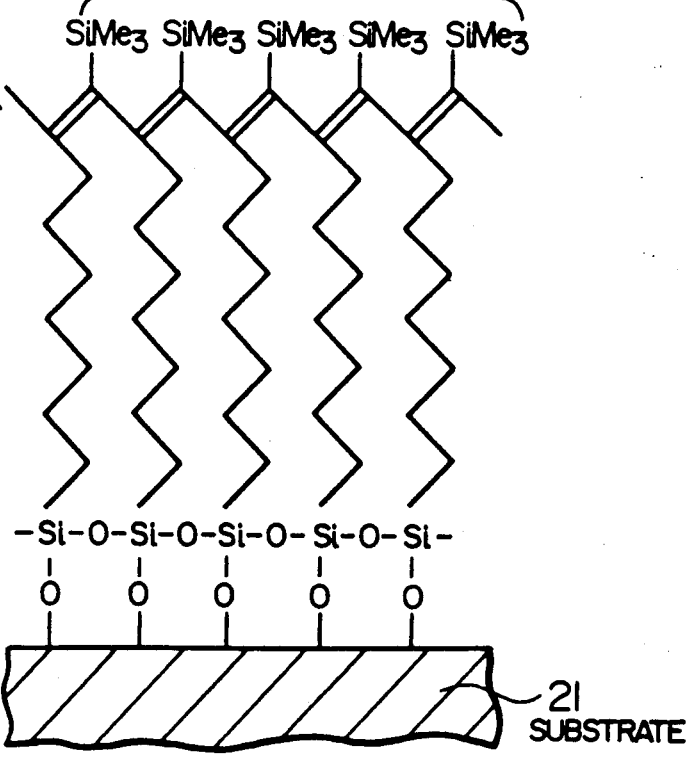

For example, in the case of tricosadiynoictrichlorosilane having one diacetylenic group, a monomolecular film 12 is formed (FIG. 3A), and then, the diacetylenic groups are selectively and linearly inactivated and polymerized in an inert gas by using UV ray (5 to 10 mJ/cm²), whereby a highly-orientated ultralong conjugated polymer having a linear polydiacetylenic bond 14 is obtained (FIG. 5B). In addition, when irradiation with X-ray, electron beam or gamma ray (5 mJ/cm²) is used in this case instead of the UV ray, a highly-orientated ultralong conjugated polymer having a linear polyacetylenic bond 13 is obtained.

And, the above embodiments have been explained concerning a process for forming only one layer of a monomolecular film and polymerizing it. However, it is also possible to employ a process which comprises building up a multi-layer monomolecular film, inactivating the unsaturated groups selectively and linearly, and then carrying out the polymerization. Further, a multi-layer built-up film of highly-orientated ultralong conjugated polymers can be also produced by repeating the monomolecular film formation-linear inactivation-polymerization procedure.

EXAMPLE 2

A silane-based surfactant, NCS,

is chemisorbed on an Si substrate 21 having a diameter of 3 inches and having an SiO₂ film formed on the surface, whereby a monomolecular film 21 is formed on the surface of the substrate 21. In this case, a chlorosilyl group (—SiCl$_x$H$_{3-x}$) of the silane-based surfactant, NCS, and an —OH group present on the SiO₂ surface of the substrate 21 react with each other to form, on the surface of the substrate 21, a monomolecular film 22 having the following structure:

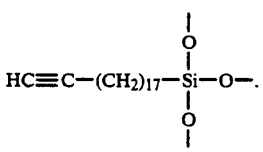

Figure 4A:
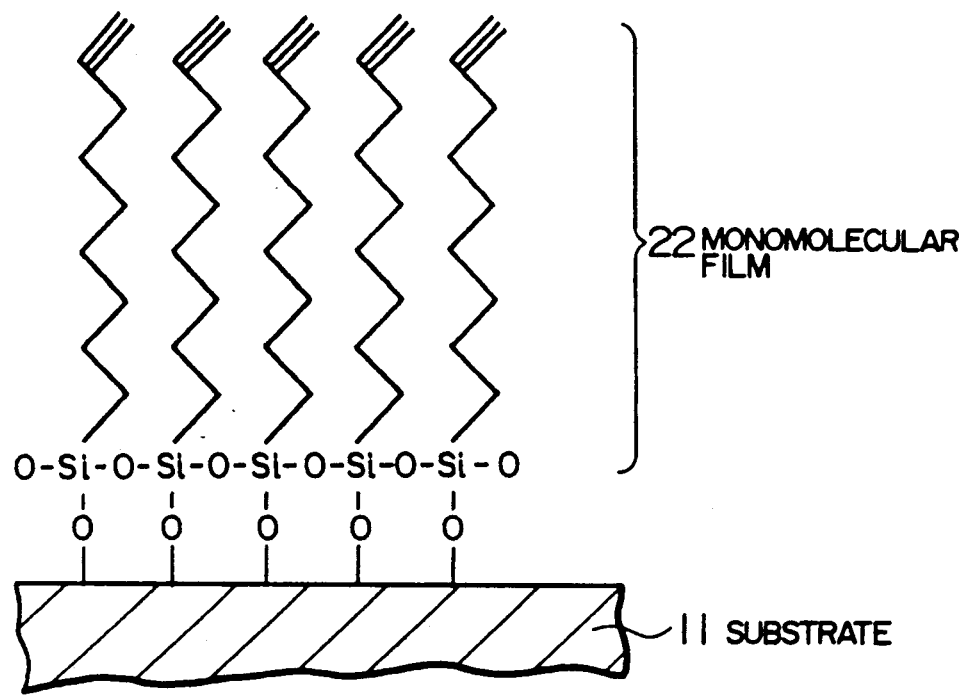
FIGS. 4A and C are process illustrations showing a process for the production of a highly-orientated ultralong conjugated polymer comprised of an NCS monomolecular film and having a trans-polyacetylenic bond.

For example, an Si substrate having an SiO₂ film formed on the surface was immersed in a solution of 3.0×10⁻³ to 4.0×10⁻³ mol/l of the above silane-based surfactant, NCS, in 80% n-hexadecane, 12% carbon tetrachloride and 8% chloroform at room temperature for 10 minutes, whereby an —Si—O— bond was formed on the SiO₂ film surface (FIG. 4A).

The formation of the monomolecular film 22 having a structure of

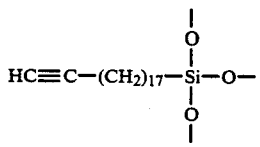

on the surface of the substrate 21 was found by FT-IR.

In addition, the formation of the monomolecular film 22 was carried out in a nitrogen atmosphere containing no moisture.

Figure 4B:
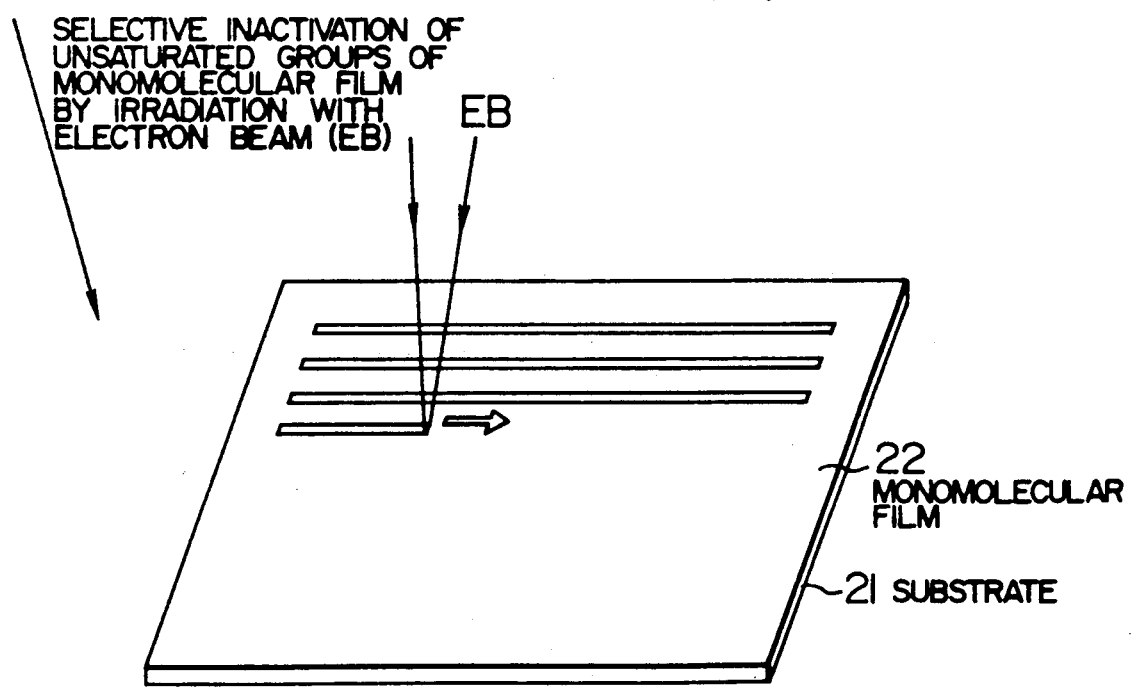
FIG. 4B is a schematic view showing a step of selectively and linearly inactivating unsaturated groups of the monomolecular film by means of electron beam exposure (EB irradiation).
Figure 4C:
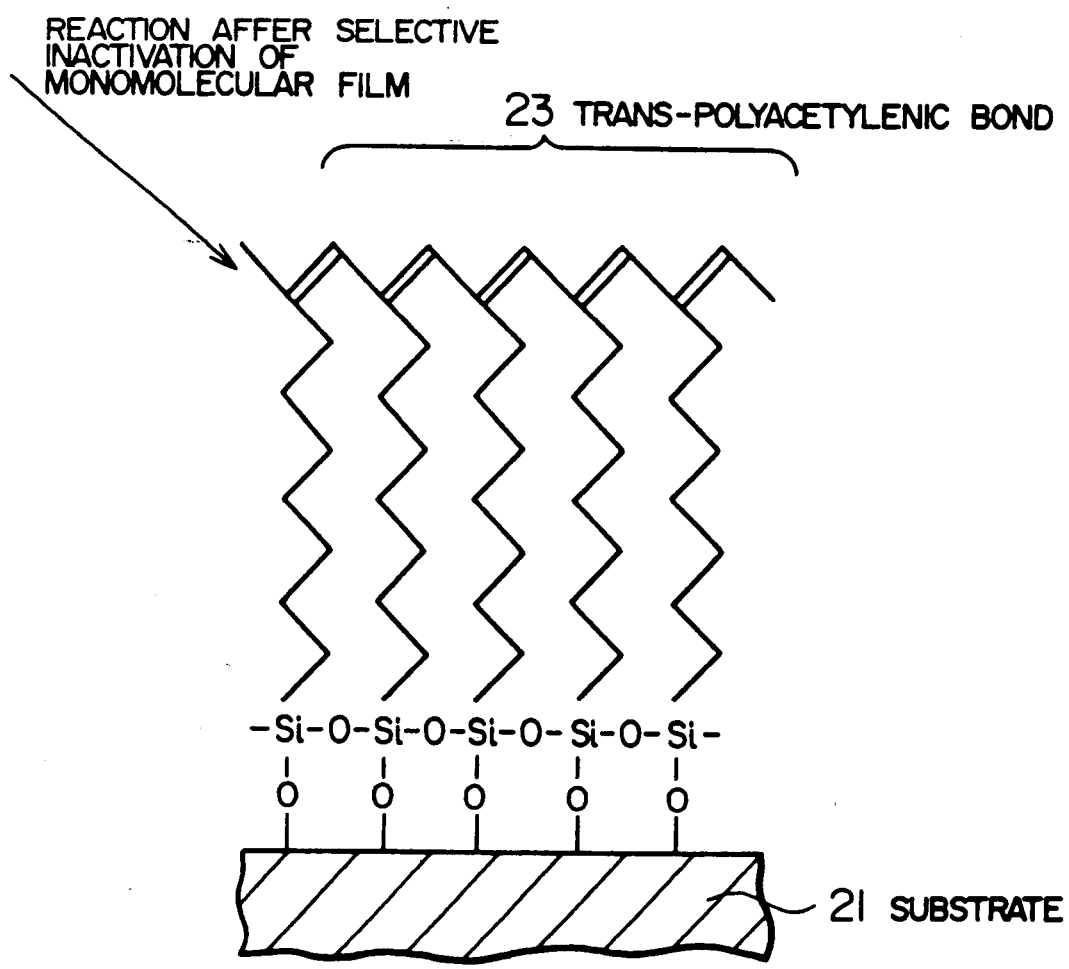

Then, as shown in FIG. 4B, unsaturated groups of the above monomolecular film were linearly inactivated by means of writing with STM (scanning tunneling microscope), exposure to electron ray or exposure to X-ray (the exposure amount may be about 5 mJ/cm² in each case) to allow the unsaturated groups to remain in a certain direction and linearly. Thereafter, the substrate 21 on which one layer of the above monomolecular film 22 was formed was immersed in a solution of molybdenum pentachloride (MoCl₅) as a catalyst in toluene, and the solution was heated to about 30° to 70° C., whereby the remaining acetylene groups which were not inactivated were polymerized by a reaction shown in FIG. 4C to form a trans-polyacetylenic bond 23, which formation was found by FT-IR. In addition, when WCl₆, NbCl₅ or TaCl₅ was used as the catalyst, monomolecular films formed by like polymerization were also obtained although their molecular weights were different. Further, when a substrate was immersed in a solution of Mo(CO)₆ or W(CO)₆ as a catalyst in carbon tetrachloride and irradiated with UV ray, polymerized reddish brown monomolecular films were obtained although they had a different molecular weight.

Further, a monomolecular film of TMS-NCS was formed on the above Si substrate 21 (FIG. 5A), and acetylenic groups of the monomolecular film were selectively inactivated. Thereafter, the substrate was immersed in a solution of tungsten hexachloride (WCl₆) as a catalyst and tetrabutyl tin (Bu₄Sn) as a cocatalyst in an amount ratio of 1:1 in toluene, and the solution was heated to about 30° to 70° C., whereby a linear highly-orientated trans-polyacetylenic bond 23 containing trimethylsilyl groups (—SiMe₃) was formed.

Figure 6A:
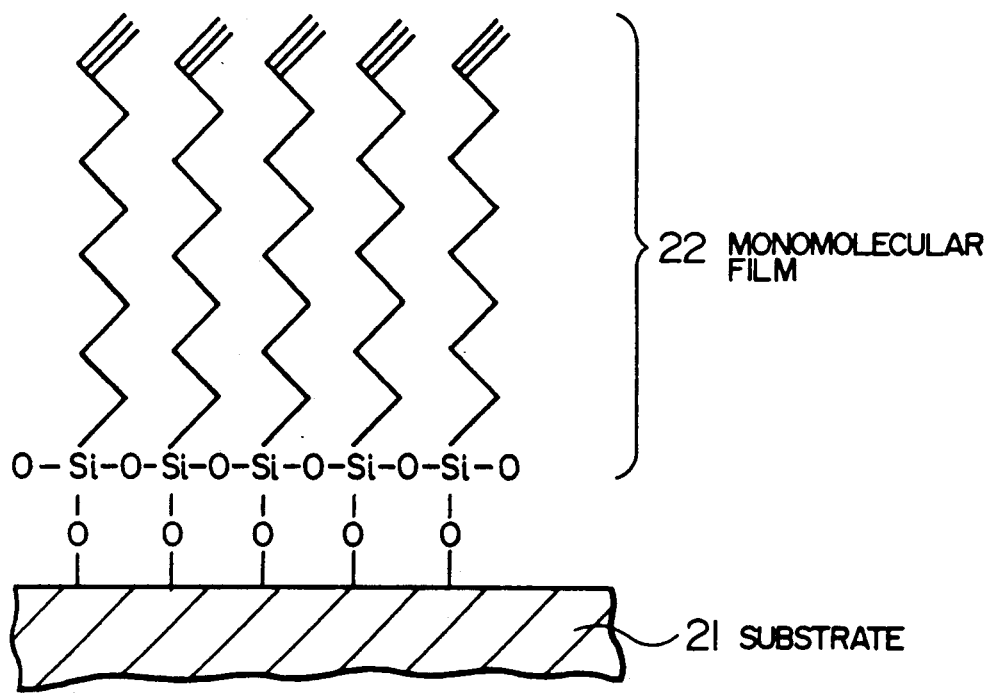
FIGS. 6A and B are process illustrations showing a process for the production of a highly-orientated ultralong conjugated polymer comprised of an NCS monomolecular film and having a cis-polyacetylenic bond.
Figure 6B:
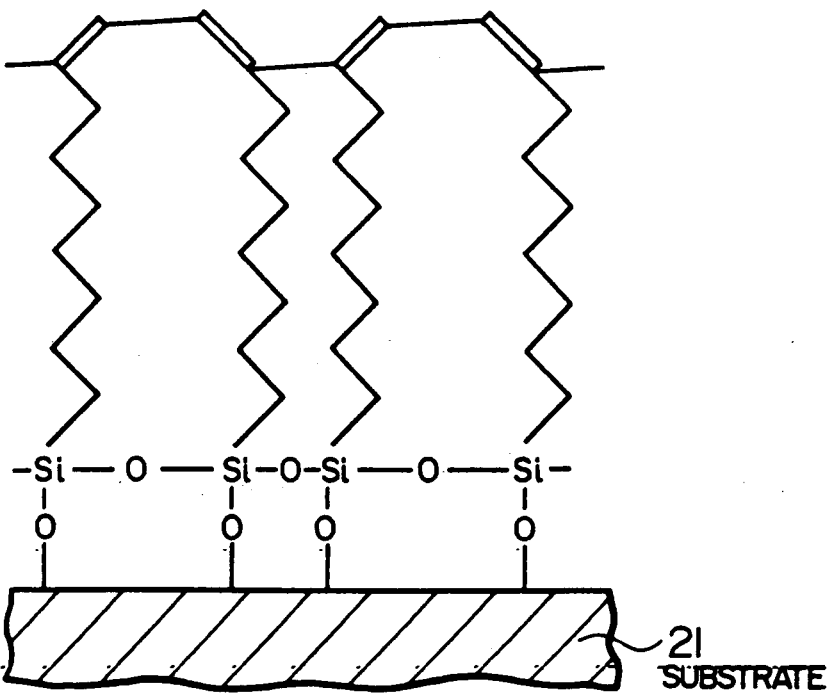

And, a substrate prepared by forming one layer of a monomolecular film 22 of NCS (FIG. 6A) on an Si substrate was immersed in a solution of molybdenum pentachloride (MoCl₅) as a catalyst in anisole, which is an organic solvent having an oxygen atom in the molecule, and the solution was heated to 30° to 70° C., whereby a linear highly-orientated cis-polyacetylenic bond 24 was formed by a reaction shown in FIG. 6B.

Figure 7A:
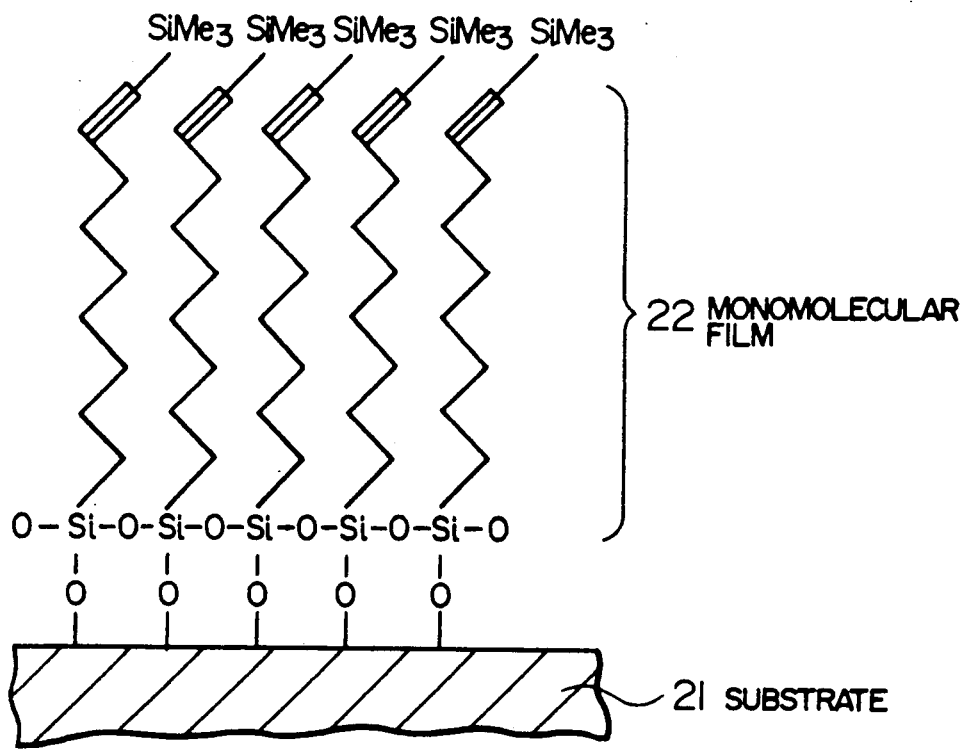
FIGS. 7A and B are process illustrations showing a process for the production of a highly-orientated ultralong conjugated polymer comprised of a TMS-NCS monomolecular film and having a cis-polyacetylenic bond.
Figure 7B:
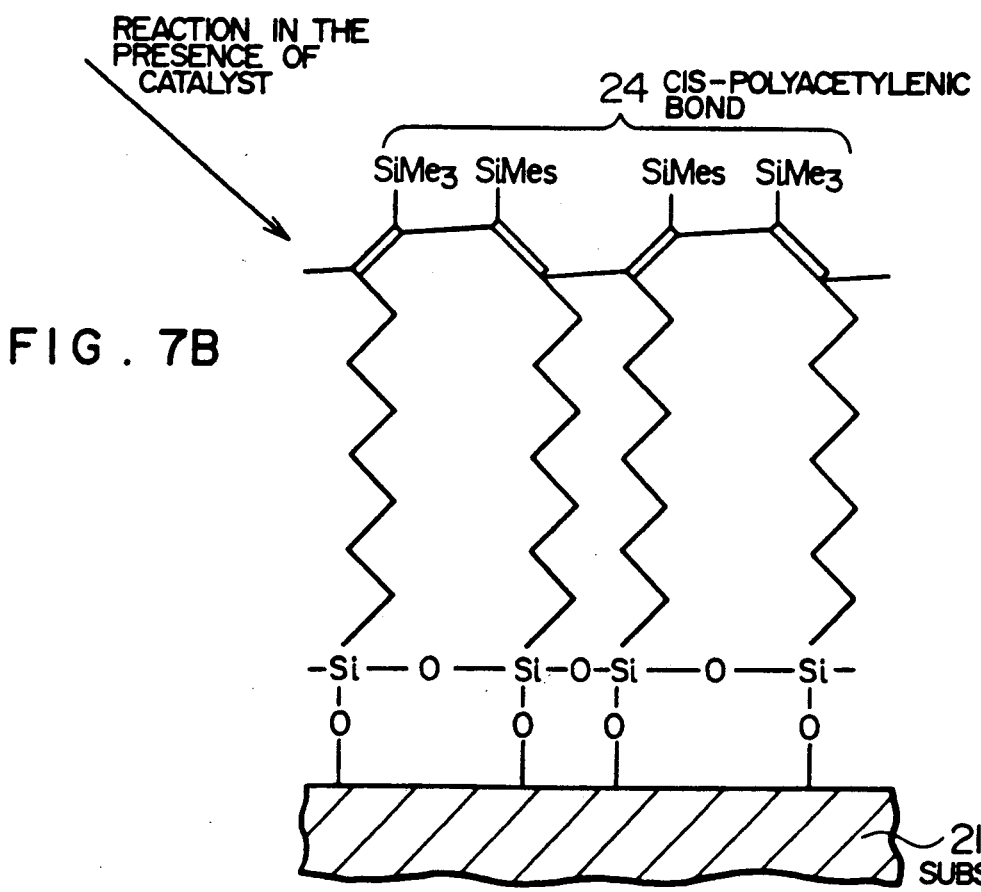

Furthermore, a substrate prepared by forming one layer of a monomolecular film 22 of TMS-NCS (FIG. 7A) was immersed in a solution of molybdenum pentachloride (MoCl₅) as a catalyst and triphenylbismuth in an amount ratio of 1:1 in anisole, which is an organic solvent having an oxygen atom in the molecule, and the solution was heated to 30° to 70° C., whereby a highly-orientated cis-polyacetylenic bond 24 containing trimethylsilyl groups (—SiMe₃) was formed by a reaction shown in FIG. 7B.

It was found that the monomolecular films built up as above were insoluble in alcohol.

The above results have shown that the polymerization method of this invention makes it possible to easily produce cis-form or trans-form highly-orientated ultralong conjugated polymers.

Further, highly-orientated ultralong conjugated polymers produced as above were remarkably stable to heat and pressure or UV ray even in an oxygen-containing atmosphere as compared with conventional polymers produced by using a Ziegler-Natta catalyst.

The above Example 2 has been explained by using only NCS and TMS-NCS as compounds to form monomolecular films. However, it is clear that compounds having, in the molecule, an unsaturated group such as an acetylenic group, etc., and capable of forming a monomolecular film by an LB method, etc., can be similarly used for the above process even if the depositing conditions differ.

Figure 8A:
FIGS. 8A-E are process illustrations showing a process for the production of a highly-orientated ultralong conjugated polymer produced as other Example.
Figure 8B:
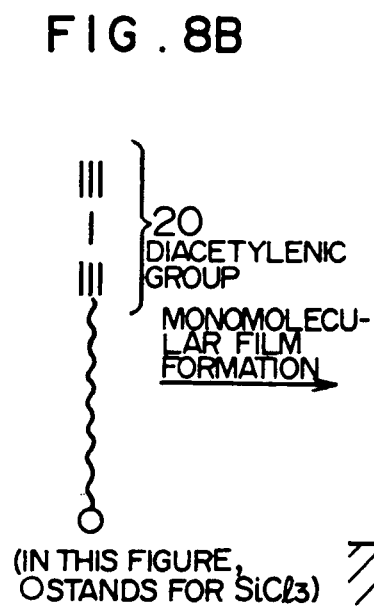
Figure 8C:
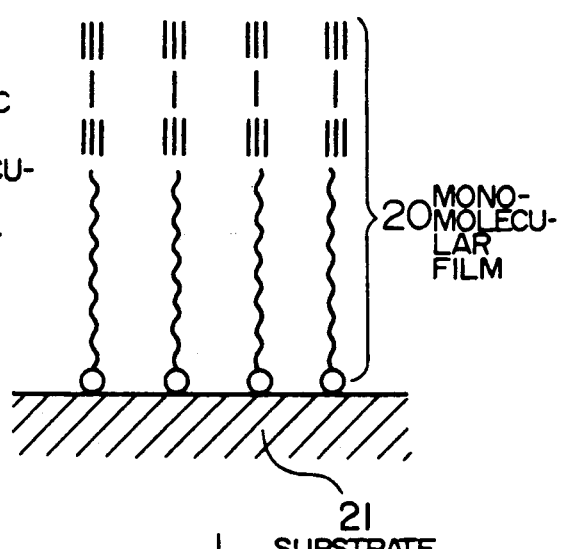
Figure 8D:
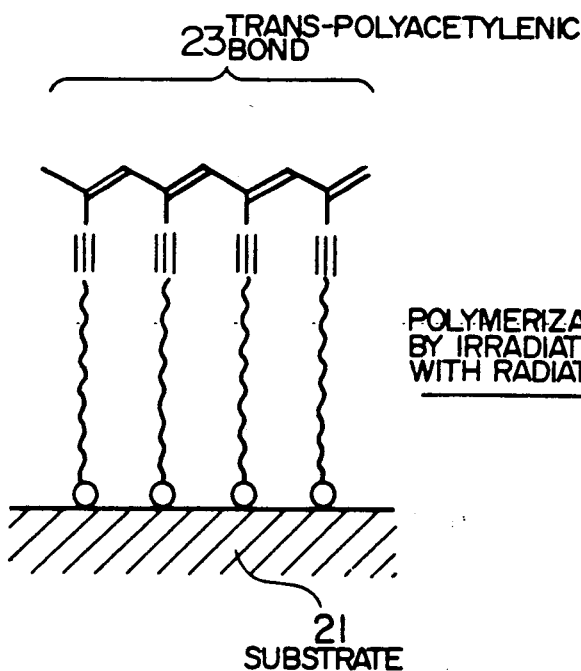
Figure 8E:
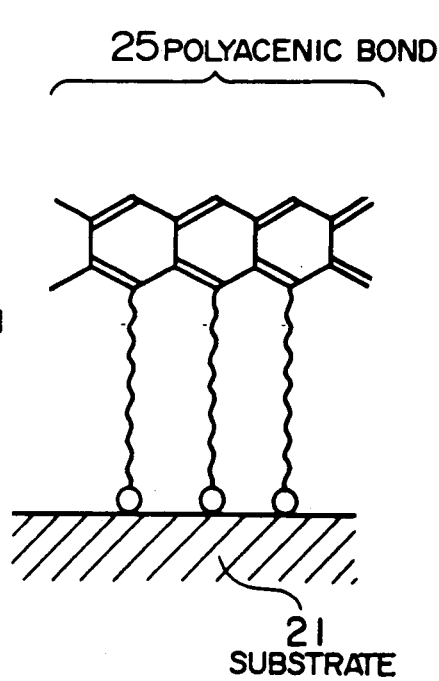

For example, in the case of tricosadiynoictrichlorosilane having one diacetylenic group (FIGS. 8A and B), a monomolecular film 22 is formed (FIG. 8C), and then, the diacetylenic groups are selectively and linearly inactivated, and polymerized by using a catalyst to give a trans-polydiacetylenic bond 23 (FIG. 8D). Further, when the monomolecular film having the trans-polyacetylenic bond 23 is irradiated with electron beam at about 5 mJ/cm² (radiations such as X-ray, gamma ray, etc., may be also used), a highly-orientated ultralong conjugated polymer having a linear polyacenic bond 25 is obtained (FIG. 8E).

And, the above Example 2 has explained a process for forming only one layer of a monomolecular film and polymerizing it. However, it is also possible to employ a process which comprises building up a multi-layer monomolecular film, inactivating the unsaturated groups selectively and linearly, and then carrying out the polymerization. Further, a multi-layer built-up film of highly-orientated ultralong conjugated polymers can be also produced by repeating the monomolecular film formation-linear inactivation-polymerization procedure.

EXAMPLE 3

A silane surfactant, NCS,

is chemisorbed on an Si substrate 31 having a diameter of 3 inches and having an SiO₂ film on the surface, whereby, a monomolecular film is formed on the surface of the substrate 31. In this case, a chlorosilyl group (—SiCl₃) of NCS and an —OH group present on the SiO₂ surface of the substrate 31 react with each other to form, on the surface of the substrate 31, a monomolecular film 32 having the following structure:

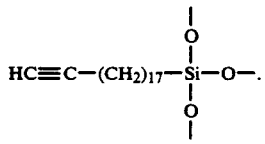

Figure 9A:
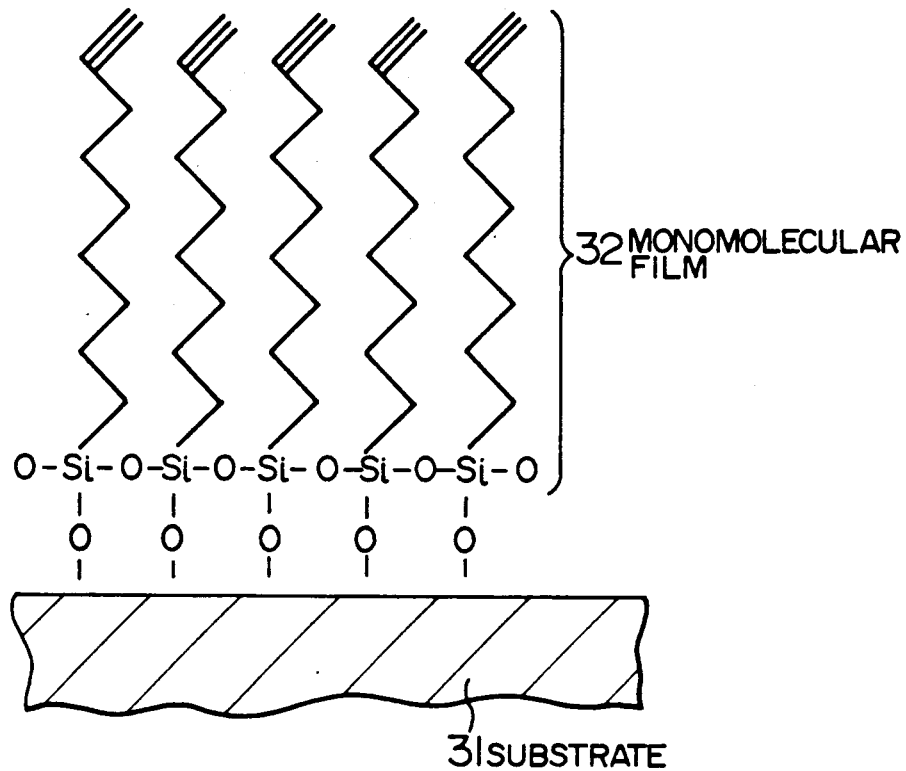
FIGS. 9A, C and D are process illustrations showing a process for the production of a highly-orientated ultralong conjugated polymer comprised of an NCS monomolecular film and having a trans-polyacetylenic bond.

As an example, an Si substrate having an SiO₂ surface formed on the surface was immersed in a solution of $1.0 \times 10^{-3}$ to $1.0 \times 10^{-2}$ mol/l of the above silane-based surfactant, NCS, in 75% n-hexadecane, 17% carbon tetrachloride and 8% chloroform at room temperature for several minutes, whereby an —Si—O— bond was formed on the SiO₂ surface (FIG. 9A).

The formation of a monomolecular film 32 having a structure of

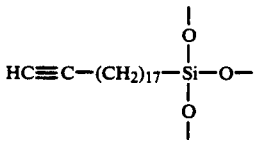

on the substrate surface was found by FT-IR.

In addition, the above formation of the monomolecular film 32 was carried out in a nitrogen atmosphere containing no moisture.

Figure 9B:
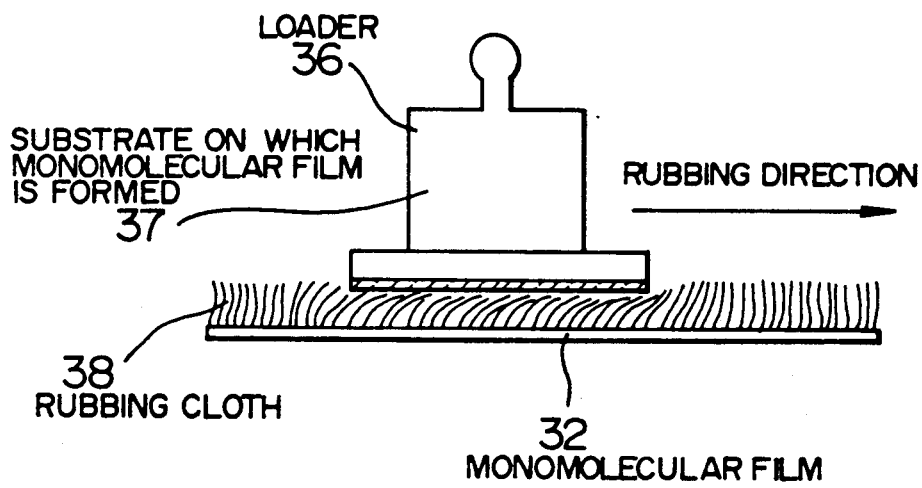
FIG. 9B is a schematic view showing a step of rubbing a monomolecular film.
Figure 9C:
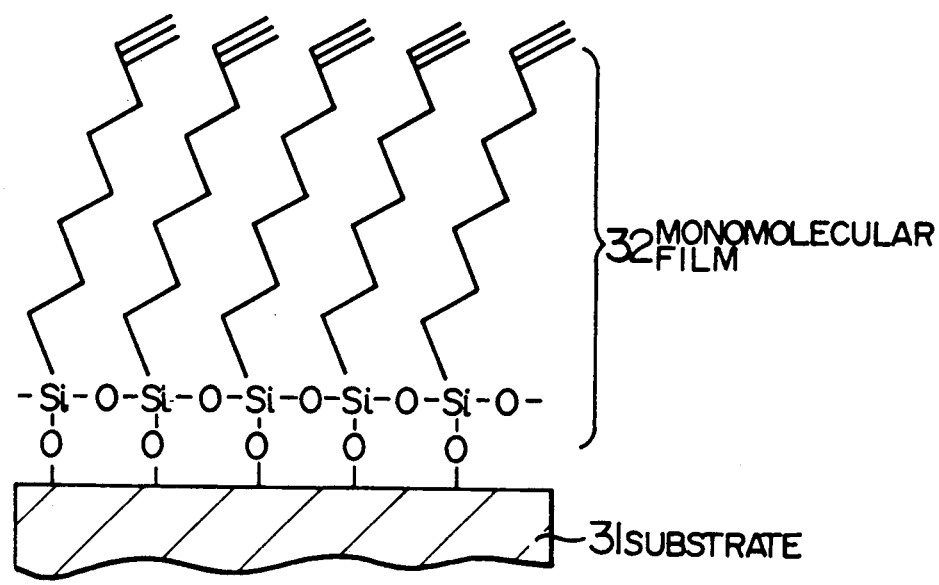
Figure 9D:
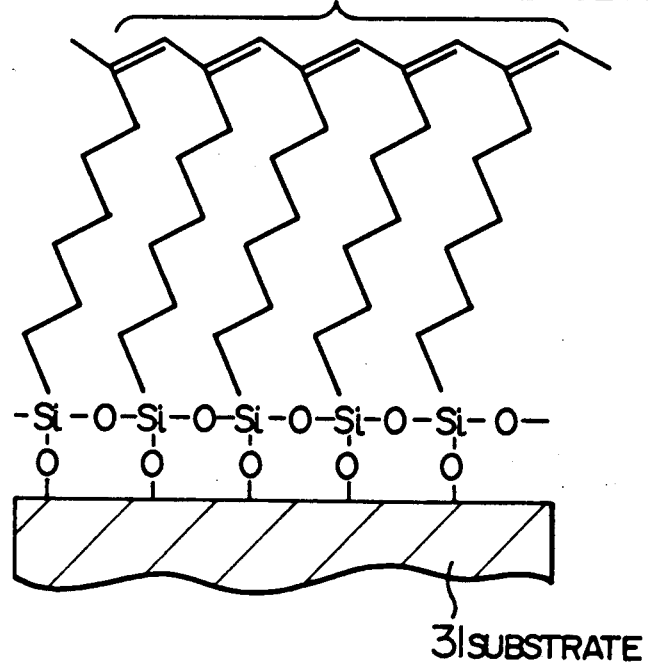

Then, the rubbing was carried out as shown in FIG. 9B to orientate the monomolecular film 32 in a specific direction (FIG. 9C). Thereafter, the monomolecular film was irradiated with radiation (e.g. X-ray at 50 mJ/cm²) to form a trans-polyacetylenic bond 33 orientated in a like direction by a reaction shown in FIG. 9D, which formation was found by FT-IR. In addition, similarly polymerized monomolecular films were obtained by using electron ray or gamma ray as radiation other than X-ray. However, when UV ray (having a wavelength of 365 nm) was used, no polymerization took place.

Figure 10A:
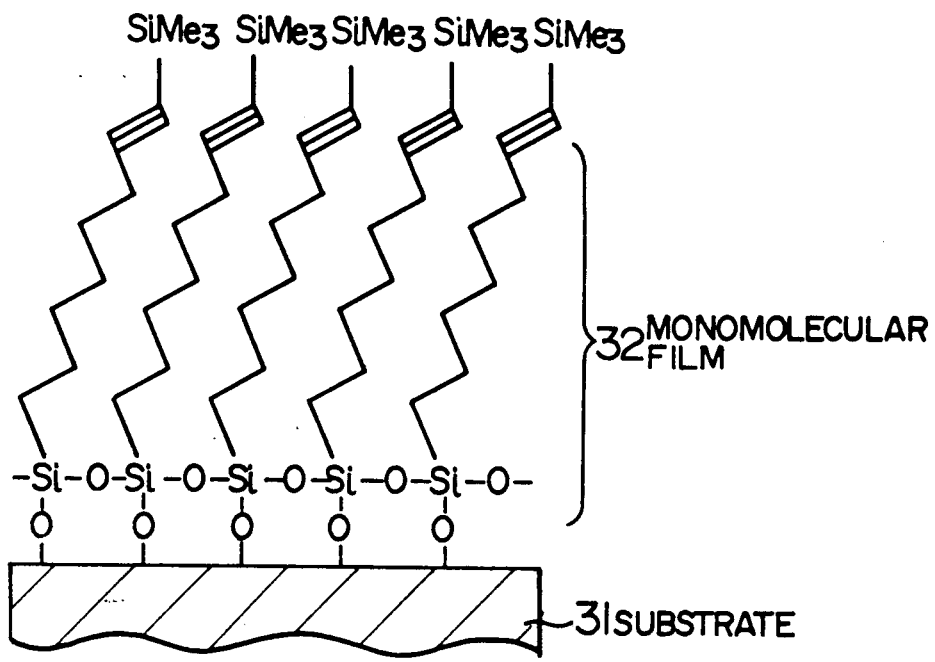
FIGS. 10A and 10B are process illustrations showing a process for the production of a highly-orientated ultralong conjugated polymer comprised of a TMS-NCS monomolecular film and having a trans-polyacetylenic bond.
Figure 10B:
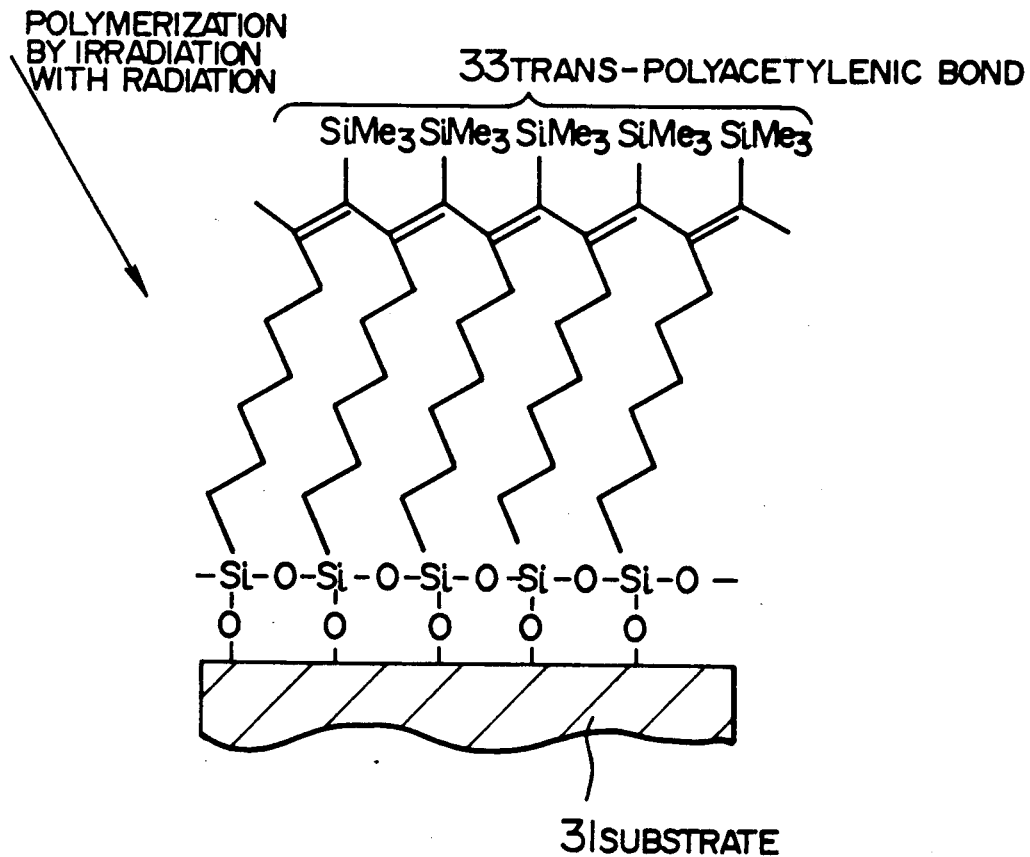

And, an Si substrate 31 having one layer of a monomolecular film 32 of TMS-NCS formed thereon was rubbed (FIG. 10A), and then the Si substrate was irradiated with radiation (e.g. X-ray at 50 mJ/cm²) in an inert gas atmosphere (e.g. helium) to form a highly-orientated trans-polyacetylenic bond 33 having trimethylsilyl groups (—SiMe₃) by a reaction shown in FIG. 10B.

It was also found that the monomolecular films formed according to the above process were insoluble in alcohol.

The above results have shown that a trans-form highly-orientated ultralong conjugated polymer can be easily produced according to a process in which the rubbing is carried out first before the polymerization as is done in this invention.

In addition, the highly-orientated ultralong conjugated polymers produced as above were remarkably stable to heat and pressure or UV rays even in an oxygen-containing atmosphere as compared with conventional polymers produced in the presence of Ziegler-Natta catalyst.

The above Example 3 has been explained by using only NCS and TMS-NCS as a compound to form monomolecular films. However, it is clear that compounds having, in the molecule, an unsaturated group such as an acetylenic group (—C≡C—), etc., and capable of forming a monomolecular film by an LB method, etc., can be similarly used for the above process even if the depositing conditions differ.

For example, in the case of tricosadiynoictrichlorosilane having one diacetylenic group, a monomolecular film 32 is formed and rubbed (FIG. 11A), and thereafter the diacetylenic groups are polymerized by using UV ray, whereby a highly-orientated ultralong conjugated polymer having a polydiacetylinic bond 34 can be obtained (FIG. 11B). And, when electron ray or X-ray is used, a polydiacetylene-type highly-orientated ultralong conjugated polymer having a polydiacetilenic bond 35 can be obtained (FIG. 11C).

The above embodiments have explained a method of carrying out linear inactivation after the rubbing. However, it is needless to say that like results can be obtained by a method of carrying out the rubbing after the linear inactivation.

And the above embodiments have explained a process for forming only one layer of a monomolecular film and polymerize it. However, it is also possible to employ a process which comprises building up a multilayer monomolecular film, then rubbing it, and then carrying out the polymerization, or a multi-layer built up film or highly-orientated ultralong polymers can be produced by continuously carrying out steps of forming a monomolecular film, rubbing it and polymerizing it.

EXAMPLE 4

A silane-based surfactant, NCS,

is chemisorbed on an Si substrate 41 having a diameter of 3 inches and having an SiO$_2$ film formed on the surface, whereby a monomolecular film 2 is formed on the surface of the substrate 41. In this case, a chlorosilyl group (—SiCl$_3$) of NCS and an —OH group present on the SiO$_2$ surface of the substrate 41 react with each other to form, on the surface of the substrate 41, a monomolecular film 42 having the following structure:

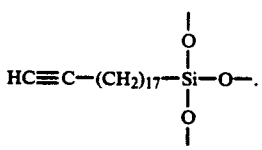

Figure 12A:
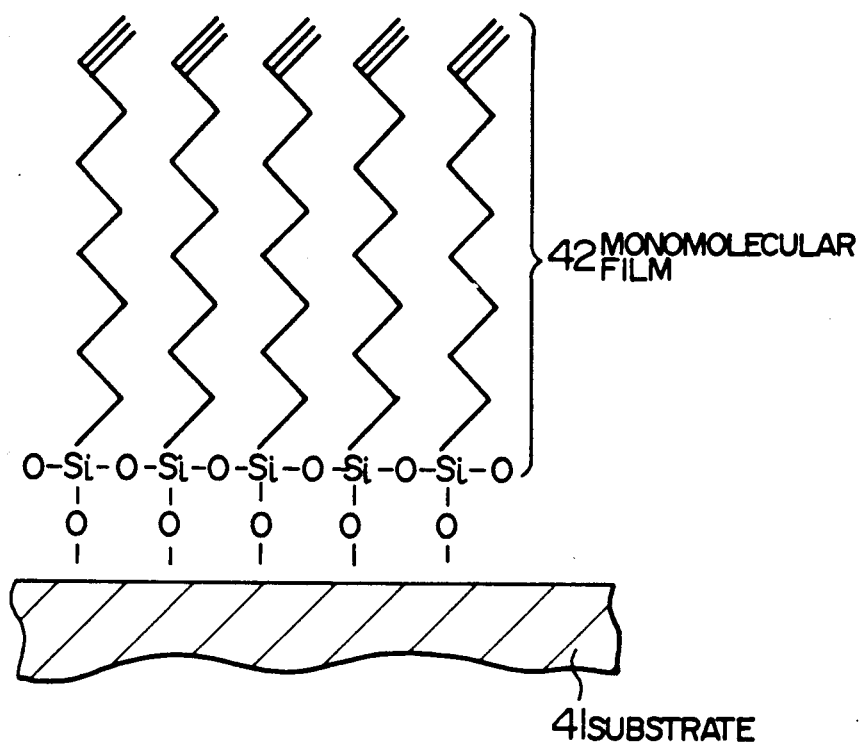
FIGS. 12A, C and D are process illustrations showing a process for the production of a highly-orientated ultralong conjugated polymer comprised of an NCS monomolecular film and having a trans-polyacetylenic bond.

As an example, an Si substrate having an SiO$_2$ surface formed on the surface was immersed in a solution of $1.0 \times 10^{-3}$ to $1.0 \times 10^{-2}$ mol/l of the above silane-based surfactant, NCS, in 75% n-hexadecane, 17% carbon tetrachloride and 8% chloroform at room temperature for several minutes, whereby an —Si—O— bond was formed on the SiO$_2$ surface (FIG. 12A).

The formation of a monomolecular film 42 having a structure of

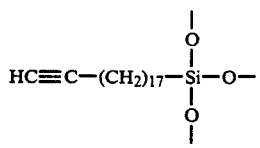

on the surface of the substrate 41 was found by FT-IR.

In addition, the above formation of the monomolecular film 42 was carried out in a nitrogen atmosphere containing no moisture.

Figure 12B:
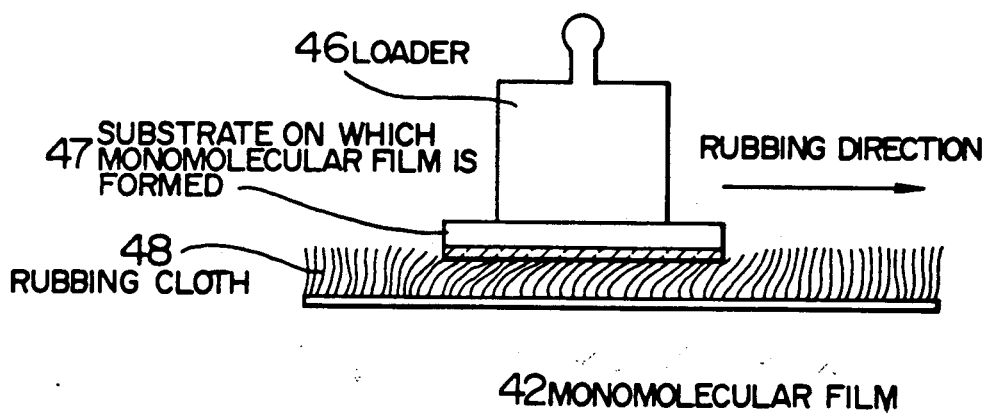
FIG. 12B is a schematic view showing a step of rubbing a monomolecular film.
Figure 12C:
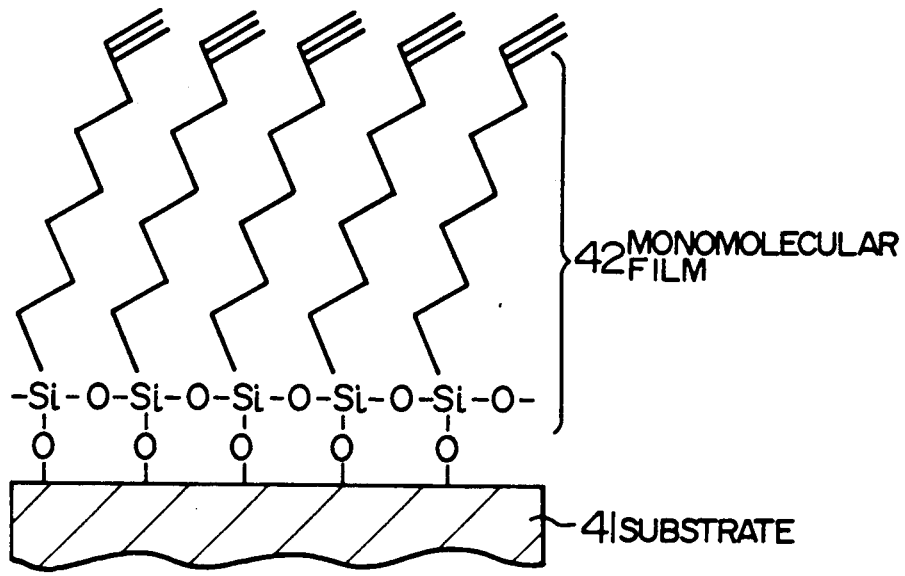
Figure 12D:
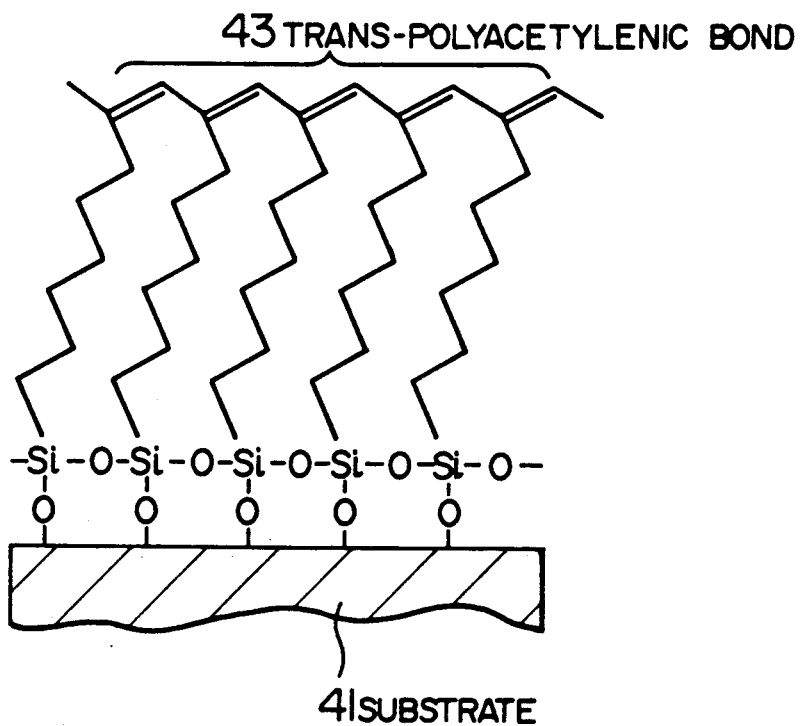

Then, the rubbing was carried out as shown in FIG. 12B to orientate the monomolecular film 42 in a specific direction (FIG. 12C). Thereafter, the substrate 41 on which one layer of the above monomolecular film 42 was formed was immersed in a solution of molybdenum pentachloride (MoCl$_5$) as a catalyst in toluene, and the solution was heated to 30° to 70° C., whereby a trans-polyacetylenic bond 43 orientated in a like direction was formed by a reaction shown in FIG. 12D, which formation was found by FT-IR. In addition, similarly polymerized monomolecular films were obtained by using WCl$_6$, NbCl, TaCl$_5$ or the like as a catalyst other than the molybdenum pentachloride, although the monomolecular films had a different molecular weight. Further, when a substrate was immersed in a solution of Mo(CO)$_6$ or W(CO)$_6$ as a catalyst in carbon tatrachloride and irradiated with UV ray, a reddish brown, polymerized monomolecular film was obtained.

And, one layer of a monomolecular film 42 of 1-(trimethylsilyl)-ω-nonadecynyltrichlorosilane

Figure 13A:
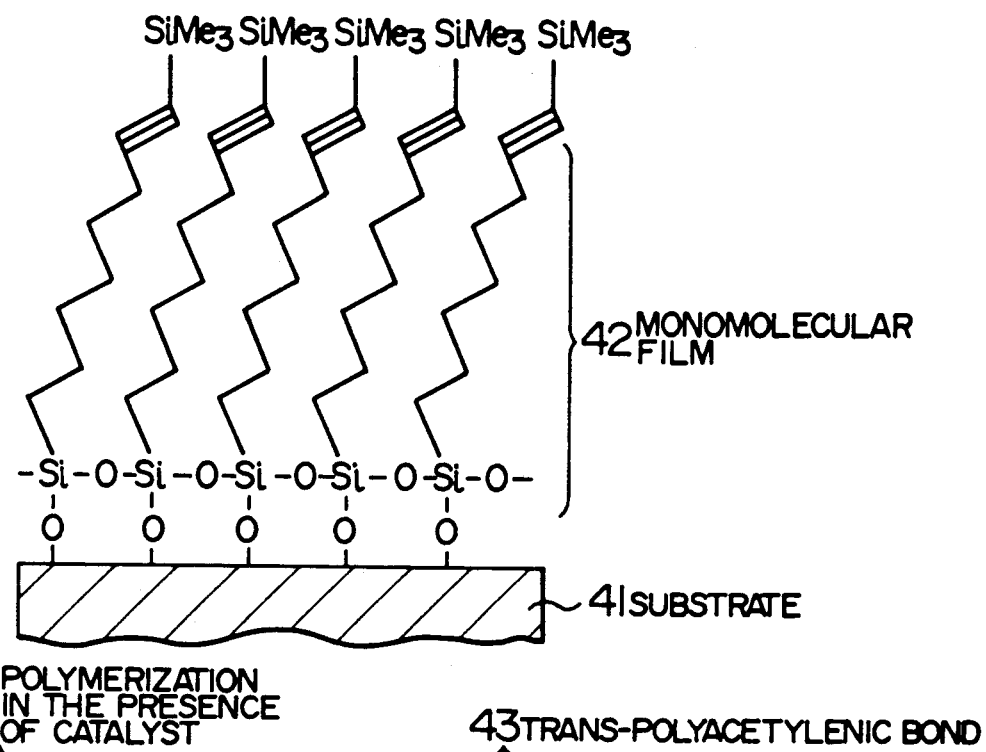
FIGS. 13A and B are process illustrations showing a process for the production of a highly-orientated ultralong conjugated polymer comprised of a TMS-NCS monomolecular film and having a trans-polyacetylenic bond.
Figure 13B:
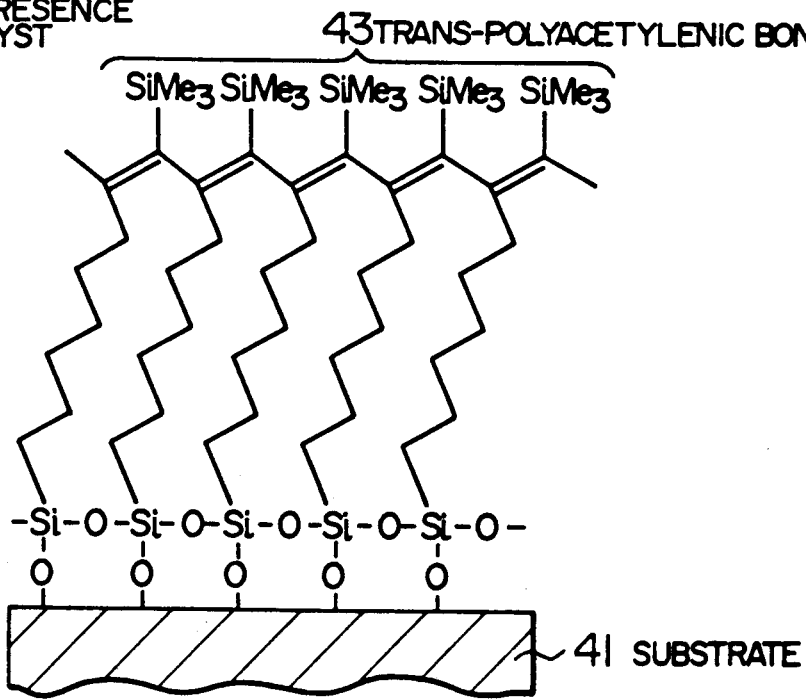

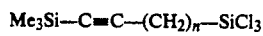

was formed on the above Si substrate 41, and the substrate 41 was rubbed (FIG. 13A). Thereafter, the Si substrate was immersed in a solution of tungsten hexachloride (WCl$_6$) as a catalyst and tetrabutyl tin (Bu$_4$) as a cocatalyst in an amount ratio of 1:1 in toluene, and the solution was heated to about 30° to 70° C., whereby a highly-orientated trans-polyacetylenic bond 43 having trimethylsilyl groups (—SiMe$_3$) was formed by a reaction shown in FIG. 13B.

Figure 14A:
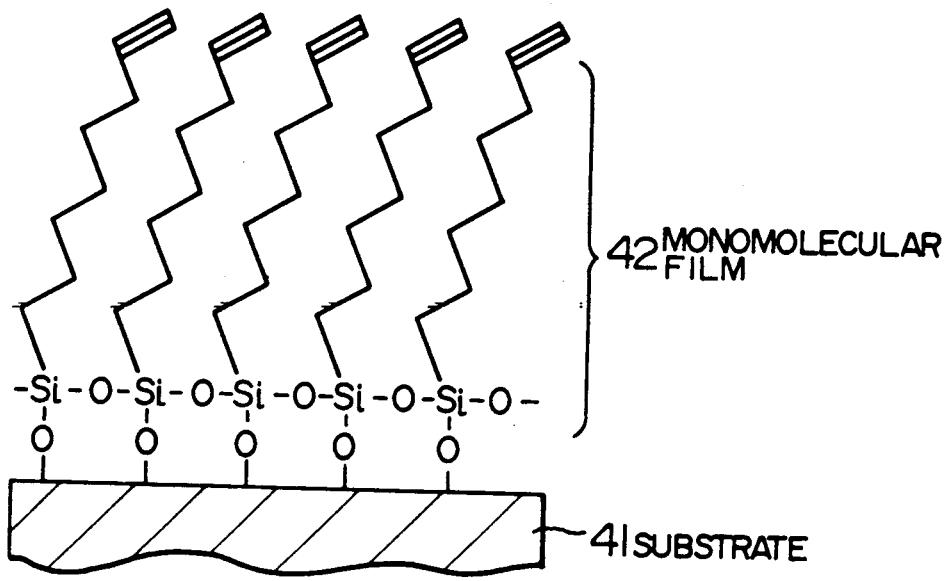
FIGS. 14A and B are process illustrations showing a process for the production of a highly-orientated ultralong conjugated polymer comprised of an NCS monomolecular film and having a cis-polyacetylenic bond.
Figure 14B:
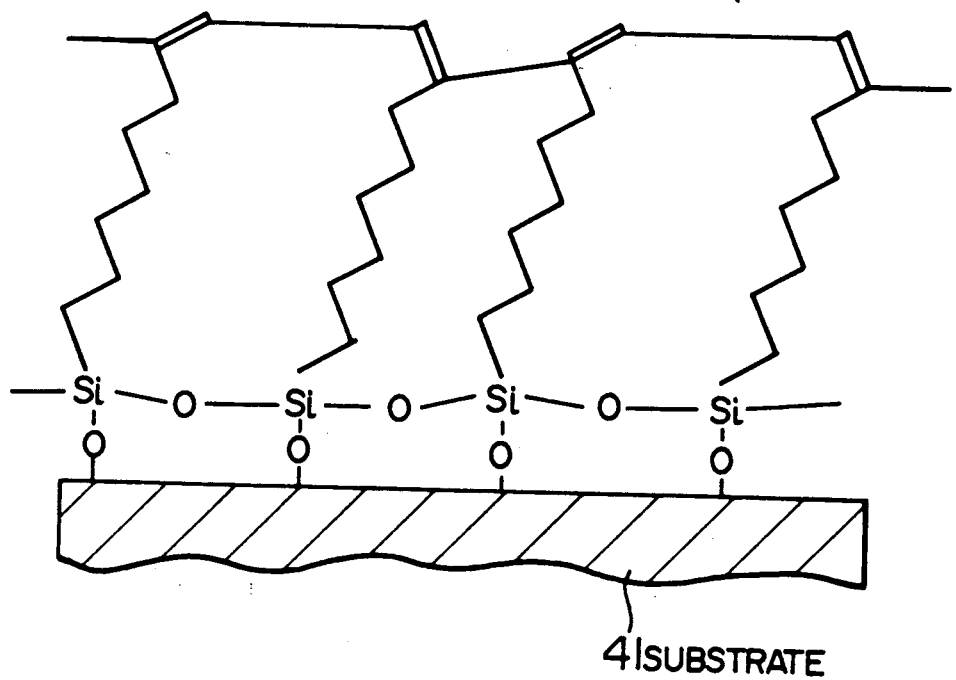

Further, a monomolecular film 42 of NCS was formed on an Si substrate 41 (FIG. 14A), and then the substrate was rubbed and immersed in a solution of molybdenum pentachloride (MoCl$_5$) in anisole, which is an organic solvent having an oxygen atom in the molecule. The solution was heated to about 30° to 70° C. to form a cis-polyacetylenic bond 44 by a reaction shown in FIG. 14B.

Figure 15A:
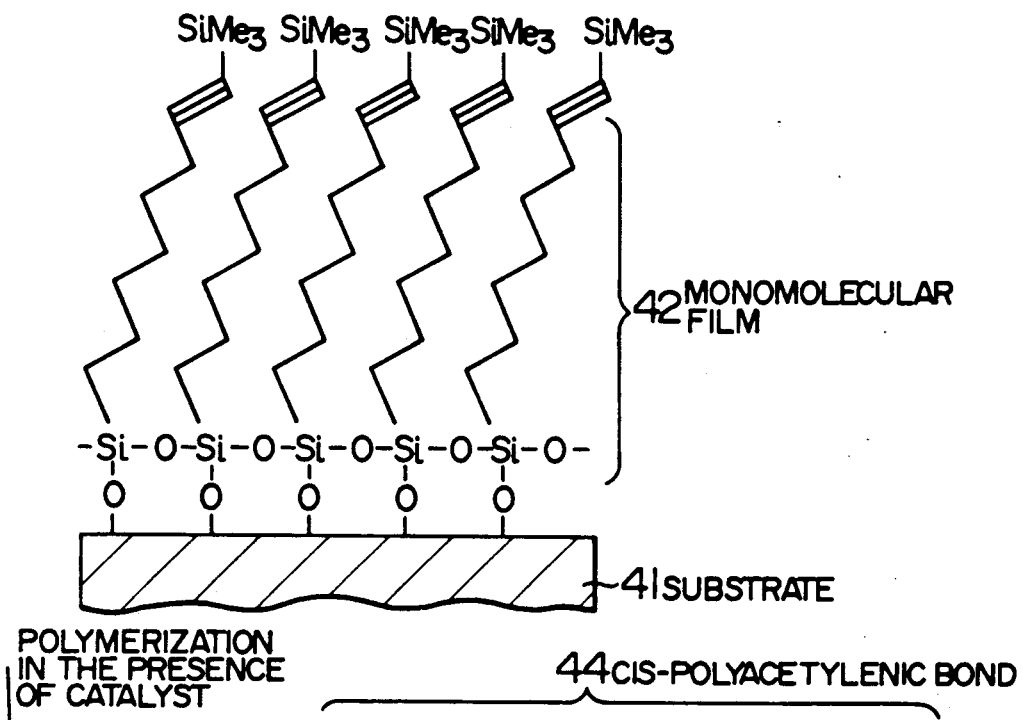
FIGS. 15A and B are process illustrations showing a process for the production of a highly-orientated ultralong conjugated polymer comprised of a TMS-NCS monomolecular film and having a cis-polyacetylenic bond.
Figure 15B:
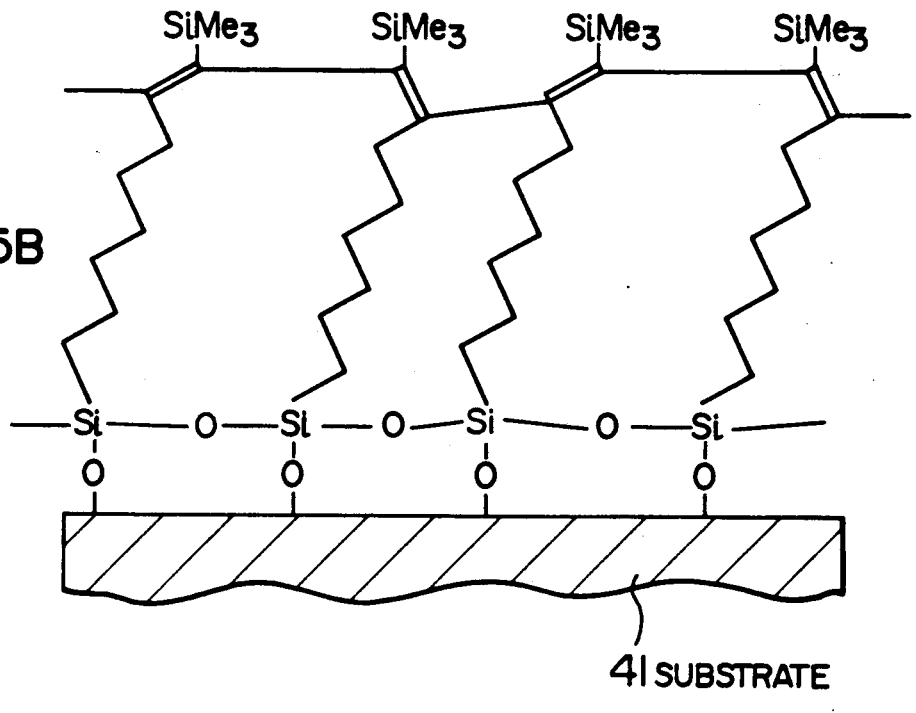

Furthermore, a monomolecular film 42 of TMS-NCS was formed on an Si substrate 41, and then the substrate was rubbed and immersed in a solution of molybdenum pentachloride (MoCl$_5$) as a catalyst and triphenylbismuth (Ph$_3$Bi) as a cocatalyst in an amount ratio of 1:1 in anisole, which is an organic solvent having an oxygen atom in the molecule. Then, the solution was heated to about 30° to 70° C., whereby a cis-polyacetylenic bond 44 having trimethylsilyl groups (—SiMe$_3$) was formed by a reaction shown in FIG. 15B.

It was also found that the monomolecular films formed according to the above process were insoluble in alcohol.

The above results have shown that a cis-form or trans-form highly-orientated ultralong conjugated polymer can be easily produced according to a process in which the rubbing is first carried out before the polymerization as is done in this invention.

In addition, the highly-orientated ultralong conjugated polymers produced as above were remarkably stable to heat and pressure or UV rays even in an oxygen-containing atmosphere as compared with conventional polymers produced in the presence of Ziegler-Natta catalyst.

The above Example 4 has been explained by using only NCS and TMS-NCS as a compound to form monomolecular films. However, it is clear that compounds having, in the molecule, an unsaturated group such as an acetylenic group (—C≡C—), etc., and capable of forming a monomolecular film by an LB method, etc., can be similarly used for the above process even if the depositing conditions differ.

Figure 16A:
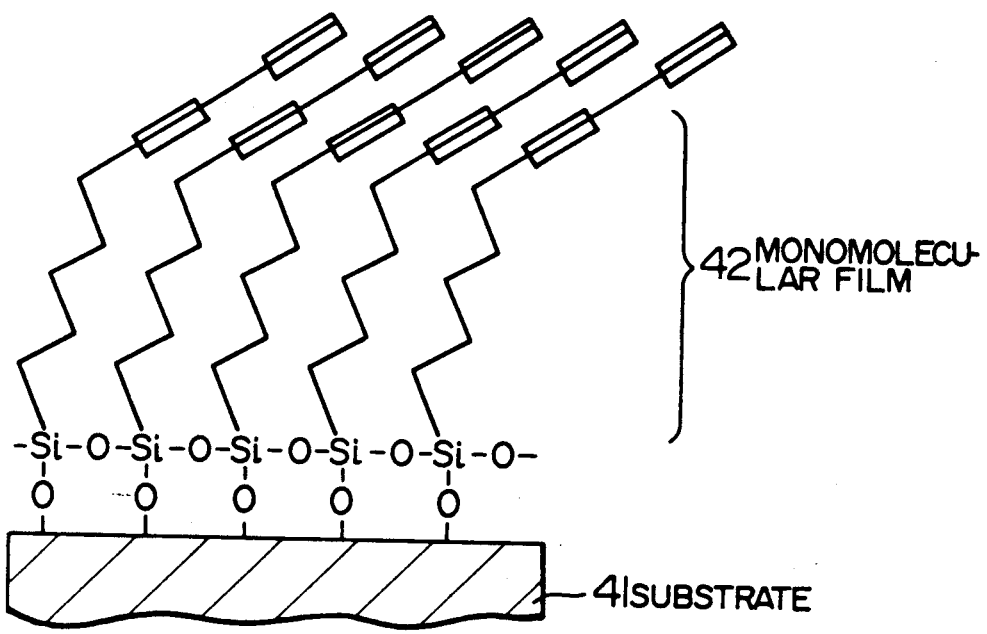
FIGS. 16A, B and C are process illustrations showing a process for the production of a highly-orientated ultralong conjugated polymer having a polyacetylenic bond.
Figure 16B:
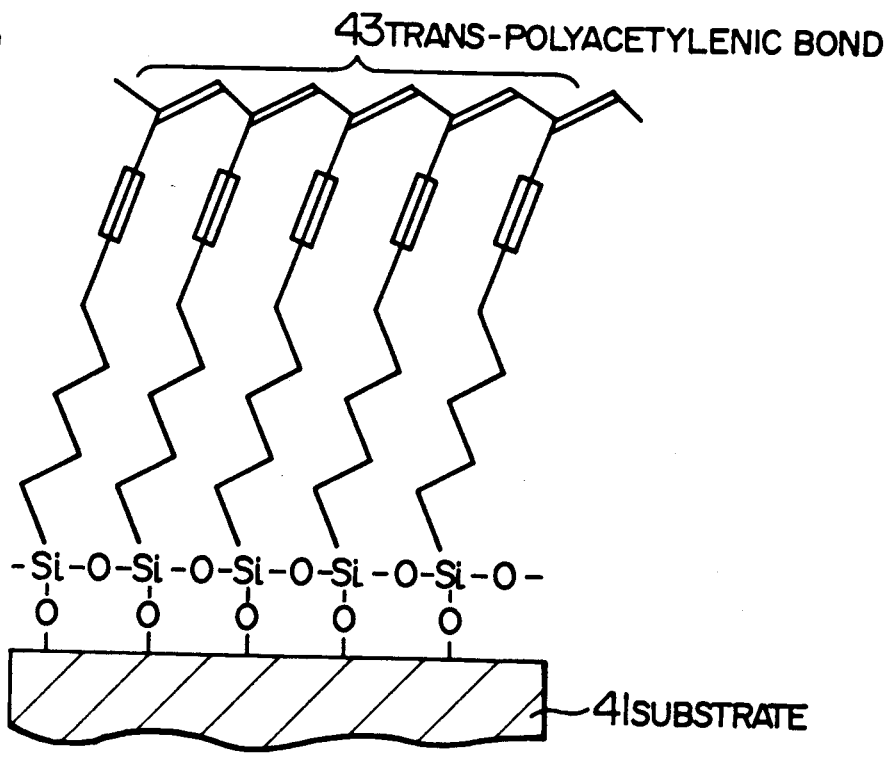
Figure 16C:
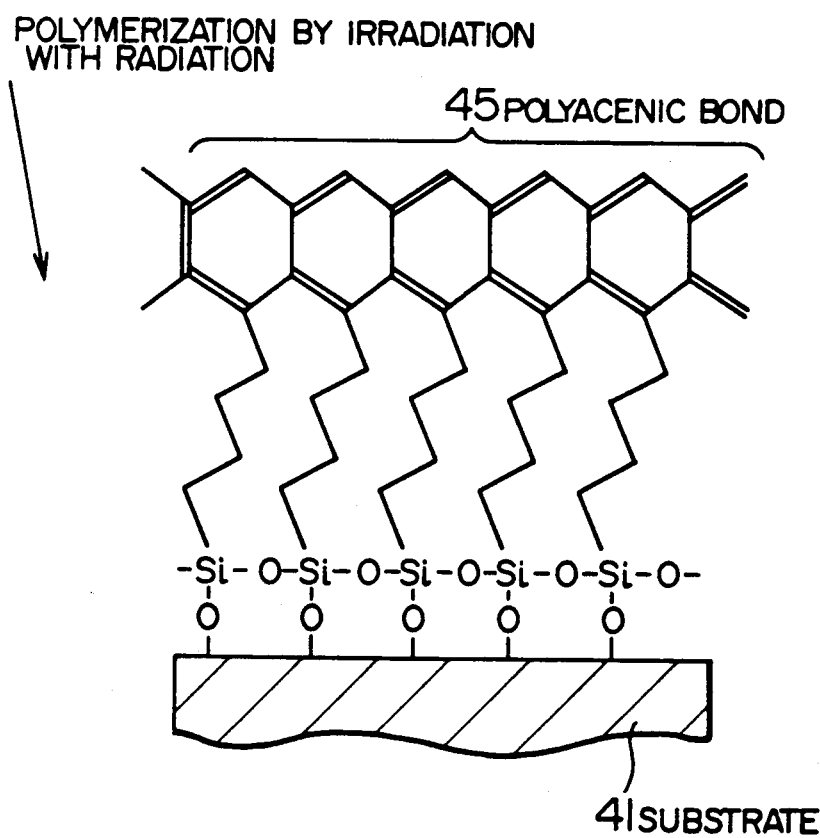

For example, in the case of tricosadiynoictrichlorosilane having one diacetylenic group,

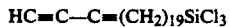

the monomolecular film 42 is formed and rubbed (FIG. 16A), and thereafter the diacetylenic groups are polymerized by using a catalyst, whereby a high-orientation monomolecular film having a polyacetylenic bond 43 can be obtained (FIG. 16B). Further, when the monomolecular film having the polyacetylenic bond 43 is irradiated with electron beam (radiations such as X-ray and gamma ray may be also used), a highly-orientated ultralong conjugated polymer having a polyacenic bond 45 can be obtained (FIG. 16C).

The above embodiments have explained a process for forming only one monomolecular film and carrying out polymerization. However, it is also possible to employ a process which comprises building up a multi-layer monomolecular film, then rubbing it, and then carrying out the polymerization, or a multi-layer built up film of highly-orientated ultralong polymers can be produced by continuously repeating steps of forming a monomolecular film, rubbing it and polymerizing it.

According to the production process of this invention, it is possible to produce, at high efficiency, stable highly-orientated ultralong conjugated polymers having a molecular weight of more than several hundreds and having excellent electric conductivity and excellent nonlinear optical effects. In addition, according to the production process of this invention, it is theoretically possible to produce linear ultrahigh-molecular-weight highly-orientated conjugated polymers of which the conjugated bond system has a length of several millimeters or more than several centimeters. Therefore, the process of this invention is very effective to manufacture devices utilizing nonlinear optical effects. Further, it is expected that stable linear ultrahigh-molecular-weight highly-orientated ultralong conjugated polymers of which the conjugated bond system is continuously several tens meter long or several meters long can be produced by optimizing types of acetylene and diacetylene derivative monomers as raw material and production conditions in the future. It may be therefore expected that the process of this invention leads to production of an organic super-conductive substance without any need of cooling.

What is claimed is:

1. A process for the production of a highly-orientated ultralong conjugated polymer, which comprises:

a step of immersing a substrate having a hydrophilic surface in a nonaqueous organic solvent containing a compound having at least an unsaturated group, such as an acetylenic group (—C≡C—), etc., and a group represented by the formula (—SiA$_x$H$_{3-x}$) in which A denotes a chloro or lower alkyl group and x is an integer of from 1 to 3, whereby forming a monomolecular film of the above compound on the substrate by chemisorption, a step of selectively and linearly inactivating unsaturated groups of the monomolecular film by means of writing with STM (scanning tunneling microscope), exposure to electron beam or exposure to X-ray, and a step of irradiating the entire surface of the substrate with radiation in an inert gas atmosphere to polymerize that remaining portion of the monomolecular film which has not been inactivated.

2. A process according to claim 1, wherein the unsaturated group is an acetylenic group or a diacetylenic group.

3. A process according to claim 1 or 2, wherein the compound has a trimethylsilyl group (—SiMe$_3$).

4. A process according to claim 1 or 2, wherein the compound is ω-nonadecynyltrichlorosilane.

5. A process according to claim 1, wherein the compound is 1-(trimethylsilyl)-ω-nonadecynyltrichlorosilane.

6. A process for the production of a highly-orientated ultralong conjugated polymer, which comprises:

a step of immersing a substrate having a hydrophilic surface in a nonaqueous organic solvent containing a compound having at least a diacetylenic group (—C≡C—C≡C—) and a group represented by the formula (—SiA$_x$H$_{3-x}$) in which A denotes a chloro or lower alkyl group and x is an integer of from 1 to 3, whereby forming a monomolecular film of the above compound on the substrate by chemisorption, a step of selectively inactivating diacetylenic groups of the monomolecular film by means of writing with STM (scanning tunneling microscope), irradiation with electron ray, exposure to X-ray or irradiation with UV ray, and a step of carrying out writing with STM (scanning tunneling microscope), irradiation with electron ray or exposure to X-ray on the entire surface of the substrate in an inert gas atmosphere to polymerize an acetylenic group portion of diacetylenic group portion of the monomolecular film.

7. A process for the production of a highly-orientated ultralong conjugated polymer, which comprises:

a step of immersing a substrate having a hydrophilic surface in a nonaqueous organic solvent containing a compound having at least a diacetylenic group (—C≡C—C≡C—) and a group represented by the formula (—SiA$_x$H$_{3-x}$) in which A denotes a chloro or lower alkyl group and x is an integer of from 1 to 3, whereby forming a monomolecular film of the above compound on the substrate by chemisorption, a step of selectively inactivating diacetylenic groups of the monomolecular film by means of writing with STM (scanning tunneling microscope), irradiation with electron ray, exposure to X-ray or irradiation with UV ray, and a step of irradiating the entire surface of the substrate with UV ray in an inert gas atmosphere to polymerize a diacetylenic group portion of the monomolecular film, 8. A process for the production of a highly-orientated ultralong conjugated polymer, which comprises:

a step of immersing a substrate having a hydrophilic surface in a nonaqueous first organic solvent containing a compound having at least an unsaturated group, such as an acetylenic group (—C≡C—), etc., and a group represented by the formula (—SiA$_x$H$_{3-x}$) in which A denotes a chloro or lower alkyl group and x is an integer of from 1 to 3, whereby forming a monomolecular film of the above compound on the substrate by chemisorption, a step of selectively and linearly inactivating unsaturated groups of the monomolecular film by means of writing with STM (scanning tunneling microscope), exposure to electron beam or exposure to X-ray, and a step of immersing the substrate on which the monomolecular film is formed in a second organic solvent containing a metal halide catalyst or metal carbonyl catalyst to polymerize that remaining unsaturated group portion of the monomolecular film which has not been inactivated.

9. A process according to claim 8, wherein the unsaturated group is an acetylenic group or diacetylenic group.

10. A process according to claim 8 or 9, wherein the compound has a trimethylsilyl group (—SiMe$_3$).

11. A process according to claim 8, wherein the metal halide catalyst or metal carbonyl catalyst comprises Mo, W, Nb or Ta.

12. A process according to any one of claims 8 to 11, wherein the second organic solvent further contains an organic tin catalyst or organic bismuth catalyst as a cocatalyst in addition to the metal halide catalyst or metal carbonyl catalyst.

13. A process according to claim 12, wherein the second organic solvent is an organic solvent containing an oxygen atom in the molecule, the metal halide catalyst is molybdenum pentachloride (MoCl$_5$), and further, the highly-orientated ultralong conjugated polymer has a cis-form.

14. A process according to claim 13, wherein the compound has a trimethylsilane group (—SiMe$_3$).

15. A process according to claim 8, 11 wherein the compound is ω-nonadecynyltrichlorosilane.

16. A process according to claim 8 in which the compound is 1-(trimethylsilyl)-ω-nonadecynyltrichlorosilane.

17. A process for the production of a high-orientated ultralong conjugated polymer, which comprises:

a step of immersing a substrate having a hydrophilic surface in a nonaqueous first organic solvent containing a compound having at least a diacetylenic group (—C≡C—C≡C—) and a group represented by the formula (—SiA$_x$H$_{3-x}$) in which A denotes a chloro or lower alkyl group and x is an integer of from 1 to 3, whereby forming a monomolecular film of the above compound on the substrate by chemisorption, a step of selectively and linearly inactivating diacetylenic groups of the monomolecular film by means of writing with STM (scanning tunneling microscope), irradiation with electron beam or exposure to X-ray, a step of immersing the substrate on which the monomolecular film is formed in a second organic solvent containing a metal halide catalyst or metal carbonyl catalyst to polymerize an acetylenic group portion of the diacetylenic groups of the monomolecular film, and a step of carrying out irradiation with radiation having high energy, after the above polymerization, to form a polyacenic bond.

18. A process for the production of a highly-orientated ultralong conjugated polymer, which comprises:

a step of immersing a substrate having a hydrophilic surface in a nonaqueous organic solvent containing a compound having at least an unsaturated group, such as an acetylenic group (—C≡C—), etc., and a group represented by the formula (—SiA$_x$H$_{3-x}$) in which A denotes a chloro or lower alkyl group and x is an in which A denotes a chloro or lower alkyl group and x is an integer of from 1 to 3, whereby forming a monomolecular film of the above compound on the substrate by chemisorption, a step of orientating the monomolecular film by rubbing, and a step of irradiating the substrate with radiation in an inert gas atmosphere to polymerize an unsaturated group portion of the monomolecular film.

19. A process according to claim 18, wherein the unsaturated group is an acetylenic group or diacetylenic group.

20. A process according to claim 18 or 19, wherein the compound has a trimethylsilyl group (—SiMe$_3$).

21. A process according to claim 18, wherein the radiation is X-ray, electron beam or gamma ray.

22. A process according to claim 18, wherein the compound is ω-nonadecynyltrichlorosilane.

23. A process according to claim 18 wherein the compound is 1-(trimethylsilyl)-ω-nonadecynyl-trichlorosilane.

24. A process for the production of a highly-orientated ultralong conjugated polymer, which comprises:

a step of immersing a substrate having a hydrophilic surface in a nonaqueous organic containing a compound having at least a diacetylenic group (—C≡C—C≡C—) and a group represented by the formula (—SiA$_x$H$_{3-x}$) in which A denotes a chloro or lower alkyl group and x is an integer of from 1 to 3, whereby forming a monomolecular film of the above compound on the substrate by chemisorption, a step of orientating the monomolecular film by rubbing it, and a step of irradiating the substrate with UV ray or radiation to polymerize a diacetylenic group portion of the monomolecular film.

25. A process for the production of a highly-orientated ultralong conjugated polymer, which comprises:

a step of immersing a substrate having a hydrophilic surface in a nonaqueous first organic solvent containing a compound having at least an unsaturated group, such as an acetylenic group (—C≡C—), etc., and a group represented by the formula (—SiA$_x$H$_{3-x}$) in which A denotes a chloro or lower alkyl group and x is an integer of from 1 to 3, whereby forming a monomolecular film of the above compound on the substrate by chemisorption, a step of orientating the monomolecular film by rubbing it, and a step of immersing the substrate on which the monomolecular film is formed in a second organic solvent containing a metal halide catalyst or metal carbonyl catalyst to polymerize an unsaturated group portion of the monomolecular film.

26. a process according to claim 25, wherein the unsaturated group is an acetylenic group or diacetylenic group.

27. A process according to claim 25, wherein the compound has a trimethylsilyl group (—SiMe$_3$).

28. A process according to claim 25, wherein the metal halide catalyst or metal carbonyl catalyst comprises Mo, W, Nb or Ta.

29. A process according to claim 25, wherein the second organic solvent further contains an organic tin catalyst or organic bismuth catalyst as a cocatalyst in addition to the metal halide catalyst or metal carbonyl catalyst.

30. A process according to claim 29, wherein the second organic solvent is an organic solvent containing an oxygen atom in the molecule, the metal halide catalyst is molybdenum pentachloride (MoCl$_5$), and further, the highly-orientated ultralong conjugated polymer has a cis-form.

31. A process according to claim 30, wherein the compound has a trimethylsilane group (—SiMe$_3$).

32. A process according to claim 25, wherein the compound is ω-nonadecynyltrichlorosilane.

33. A process according to claim 25, wherein the compound is 1-(trimethylsilyl)-ω-nonadecynyltrichlorosilane.

34. A process for the production of a highly-orientated ultralong conjugated polymer, which comprises:

a step of immersing a substrate having a hydrophilic surface in a nonaqueous first organic solvent containing a compound having at least a diacetylenic group (—C≡C—C≡C—) and a group represented by the formula (—SiA$_x$H$_{3-x}$) in which A denotes a chloro or lower alkyl group and X is an integer of from 1 to 3, whereby forming a monomolecular film of the above compound on the substrate by chemisorption, a step of orientating the monomolecular film by rubbing it, a step of immersing the substrate on which the monomolecular film is formed in a second organic solvent containing a metal halide catalyst or metal carbonyl catalyst to polymerize an acetylenic group portion of the diacetylenic groups of the monomolecular film, and a step of carrying out irradiation with radiation with radiation having high energy, after the above polymerization, to form a polyacenic bond.

* * * * *